United States Patent
Ishihara et al.

(10) Patent No.: US 11,416,152 B2
(45) Date of Patent: Aug. 16, 2022

(54) INFORMATION PROCESSING DEVICE, INFORMATION PROCESSING METHOD, COMPUTER-READABLE STORAGE MEDIUM, AND INFORMATION PROCESSING SYSTEM

(71) Applicant: KIOXIA CORPORATION, Minato-ku (JP)

(72) Inventors: Takeshi Ishihara, Yokohama (JP); Shinichi Kanno, Ota (JP)

(73) Assignee: KIOXIA CORPORATON, Minato-ku (JP)

( * ) Notice: Subject to any disclaimer, the term of this patent is extended or adjusted under 35 U.S.C. 154(b) by 136 days.

(21) Appl. No.: 15/915,589

(22) Filed: Mar. 8, 2018

(65) Prior Publication Data
US 2019/0079688 A1    Mar. 14, 2019

(30) Foreign Application Priority Data
Sep. 12, 2017    (JP) .............................. JP2017-175007

(51) Int. Cl.
*G06F 3/06*    (2006.01)

(52) U.S. Cl.
CPC .......... *G06F 3/0632* (2013.01); *G06F 3/0604* (2013.01); *G06F 3/0653* (2013.01); *G06F 3/0673* (2013.01)

(58) Field of Classification Search
None
See application file for complete search history.

(56) References Cited

U.S. PATENT DOCUMENTS

| 6,874,072 | B2 * | 3/2005 | Aasland | G11B 27/107 |
| | | | | 711/111 |
| 8,645,655 | B2 | 2/2014 | Mori et al. | |
| 8,868,872 | B2 | 10/2014 | Mori et al. | |
| 9,015,442 | B2 | 4/2015 | Mori et al. | |
| 9,405,478 | B2 | 8/2016 | Koseki et al. | |
| 2009/0204708 | A1 * | 8/2009 | Canto | H04L 41/082 |
| | | | | 709/224 |

(Continued)

FOREIGN PATENT DOCUMENTS

| JP | 2010-97526 A | 4/2010 |
| JP | 2013-171305 A | 9/2013 |

(Continued)

*Primary Examiner* — Charles Rones
*Assistant Examiner* — Ryan Dare
(74) *Attorney, Agent, or Firm* — Oblon, McClelland, Maier & Neustadt, L.L.P.

(57) ABSTRACT

According to one embodiment, an information processing device includes a characteristics monitoring unit, a determination unit, and a notification unit. The characteristics monitoring unit monitors characteristics information that indicates at least one of its performance and lifetime with respect to a storage device, and includes input/output characteristics. The determination unit determines, based on monitored characteristics information including the input/output characteristics, whether change instruction for changing characteristics is to be notified to the storage device. The notification unit notifies the storage device of the change instruction when the determination unit determines that the change instruction is to be notified.

17 Claims, 19 Drawing Sheets

(56) References Cited

U.S. PATENT DOCUMENTS

| | | | |
|---|---|---|---|
| 2010/0100604 A1* | 4/2010 | Fujiwara | G06F 12/0866 709/213 |
| 2011/0055559 A1* | 3/2011 | Li | H04L 9/0894 713/165 |
| 2013/0282925 A1* | 10/2013 | Cawse | G06F 13/385 710/2 |
| 2016/0306557 A1 | 10/2016 | Koseki et al. | |
| 2017/0132044 A1 | 5/2017 | Kaneko | |
| 2017/0199817 A1 | 7/2017 | Ishihara et al. | |

FOREIGN PATENT DOCUMENTS

| | | |
|---|---|---|
| JP | 2015-505078 | 2/2015 |
| JP | 2017-123110 | 7/2017 |
| WO | WO 2013/046331 A1 | 4/2013 |
| WO | WO 2016/157274 A1 | 10/2016 |

\* cited by examiner

FIG.1

FIG.2A
INPUT/OUTPUT CHARACTERISTICS DB     14C

| SERVICE ID | INPUT/OUTPUT CHARACTERISTICS | | TIME POINT |
|---|---|---|---|
| | INPUT/OUTPUT CHARACTERISTICS TYPE | CHARACTERISTIC VALUE | |
| 01 | NUMBER OF CREATION TIMES | Va | Ta |
| 01 | NUMBER OF DELETION TIMES | Vb | Tb |
| 01 | NUMBER OF READ BYTES | Vc | Tc |
| 02 | NUMBER OF WRITE BYTES | Vd | Td |
| ⋮ | | | |

FIG.2B
ALLOWABLE CONDITION DB     14A

| SERVICE ID | ALLOWABLE CONDITION | | | SETTING VALUE |
|---|---|---|---|---|
| | INPUT/OUTPUT CHARACTERISTICS TYPE | ALLOWABLE RANGE | | |
| | | ALLOWABLE LOWER LIMIT | ALLOWABLE UPPER LIMIT | |
| 01 | NUMBER OF CREATION TIMES | La | Ua | A |
| 02 | | Lb (=Ua) | Ub | B |
| 03 | | Lc (=Ub) | Uc | C |
| 04 | | Ld (=Uc) | Ud | D |
| 05 | | Le (=Ud) | Ue | E |
| ⋮ | | | | |

FIG.2C
     14A

| SERVICE ID | ALLOWABLE CONDITION | | | SETTING VALUE |
|---|---|---|---|---|
| | INPUT/OUTPUT CHARACTERISTICS TYPE | ALLOWABLE RANGE | | |
| | | ALLOWABLE LOWER LIMIT | ALLOWABLE UPPER LIMIT | |
| 01 | NUMBER OF CREATION TIMES | La | Ua | A |
| 02 | | Lb (=Ua) | Ub | B |
| 03 | | Lc (>Ub) | Uc | C |
| 04 | | Ld (=Uc) | Ud | D |
| 05 | | Le (>Ud) | Ue | E |
| ⋮ | | | | |

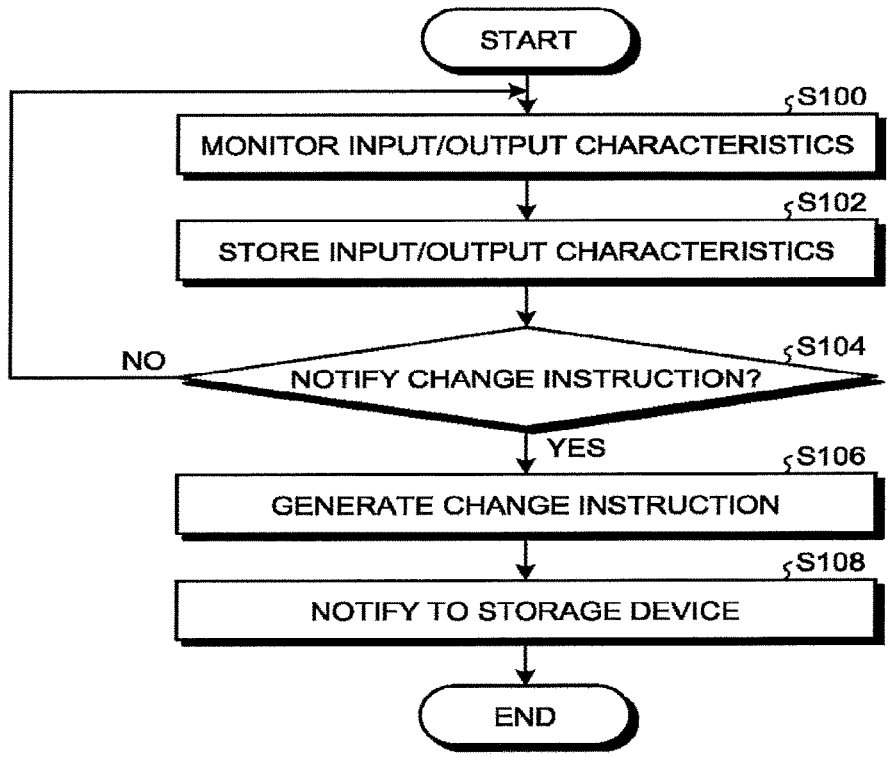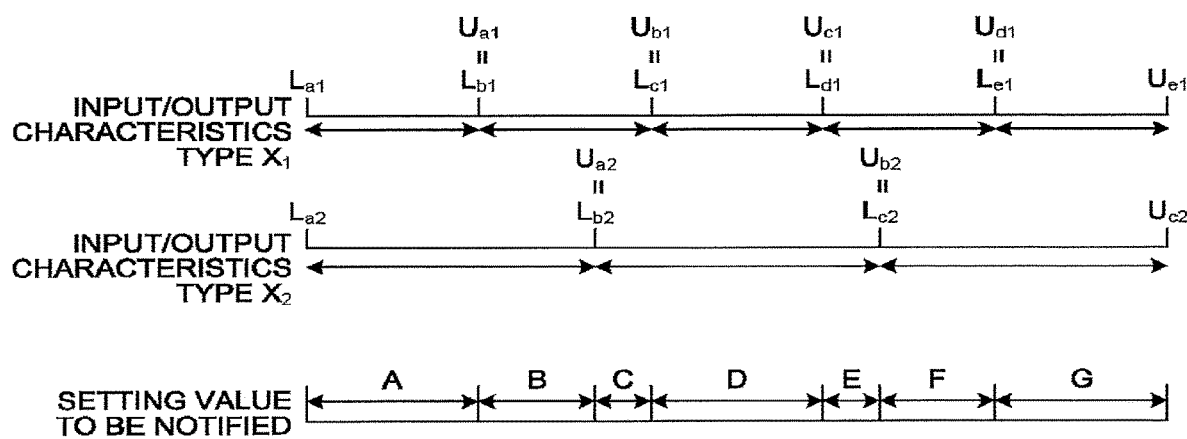

FIG.10

| SERVICE ID | ALLOWABLE CONDITION ||||  SETTING VALUE |
| | INPUT/OUTPUT CHARACTERISTICS TYPE $X_1$ || INPUT/OUTPUT CHARACTERISTICS TYPE $X_2$ |||
| | ALLOWABLE CONDITION || ALLOWABLE CONDITION |||
| | ALLOWABLE LOWER LIMIT | ALLOWABLE UPPER LIMIT | ALLOWABLE LOWER LIMIT | ALLOWABLE UPPER LIMIT | |
|---|---|---|---|---|---|
| 01 | $L_{a1}$ | $U_{a1}$ | $L_{a2}$ | $U_{a2}$ | A |
| 02 | $L_{b1}\ (=U_{a1})$ | $U_{b1}$ | | | B |
| 03 | | | $L_{b2}\ (=U_{a2})$ | $U_{b2}$ | C |
| 04 | $L_{c1}\ (=U_{b1})$ | $U_{c1}$ | | | D |
| 05 | $L_{d1}\ (=U_{c1})$ | $U_{d1}$ | | | E |
| 06 | | | $L_{c2}\ (=U_{b2})$ | $U_{c2}$ | F |
| 07 | $L_{e1}\ (=U_{d1})$ | $U_{e1}$ | | | G |
| ⋮ ||||||

14A

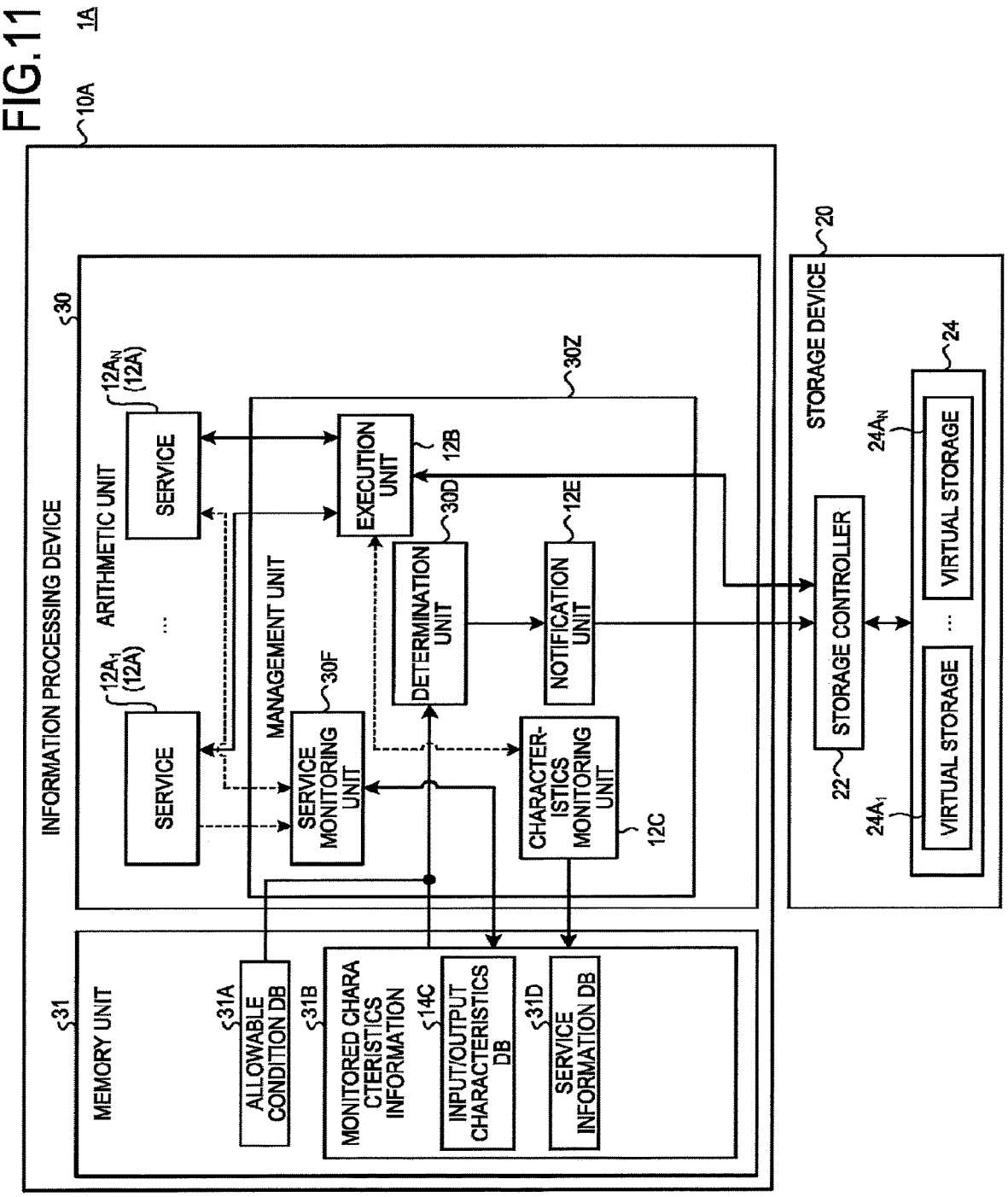

SERVICE INFORMATION DB

| SERVICE ID | SERVICE INFORMATION | | TIME POINT |
| --- | --- | --- | --- |
| | SERVICE TYPE | VALUE | |
| 01 | EXPIRATION DATE OF FILE | Za | Ta |
| ⋮ | | | |

INTERNAL STATE DB

| INTERNAL CONDITION<br>(INTERNAL STATE TYPE/CONDITION VALUE) | TIME POINT |
|---|---|
| ⋮ | ⋮ |

33E

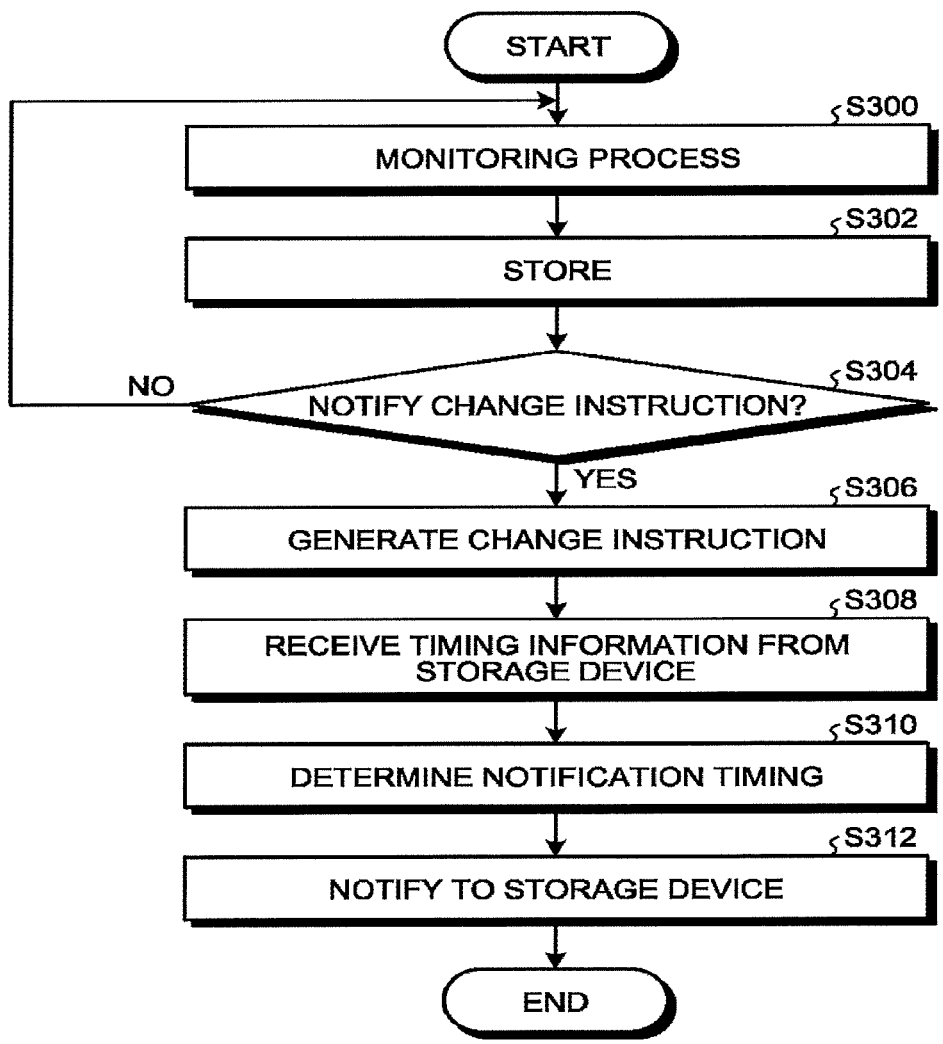

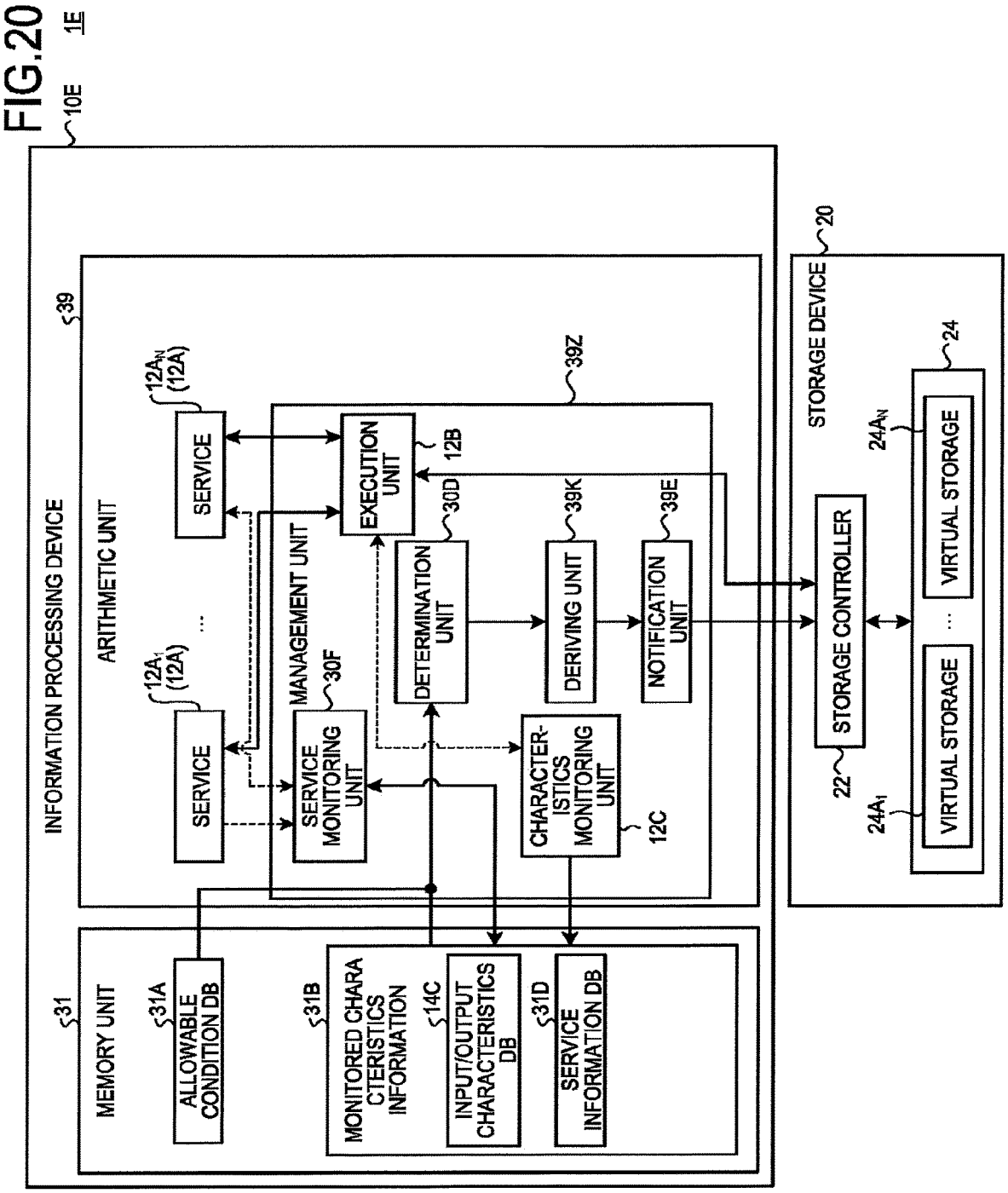

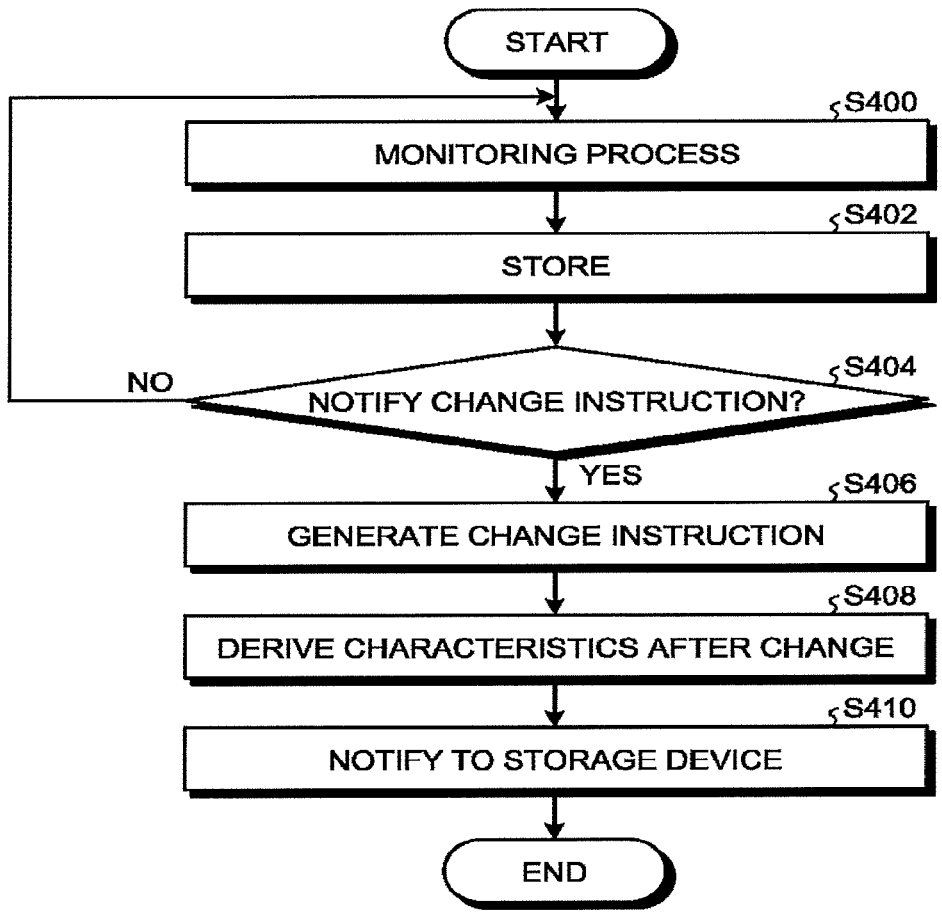
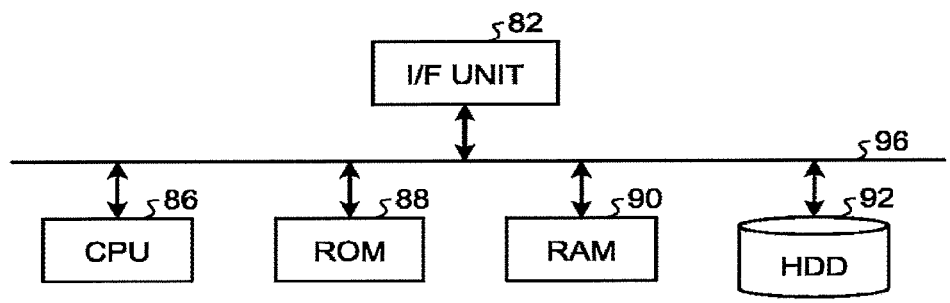

INFORMATION PROCESSING DEVICE, INFORMATION PROCESSING METHOD, COMPUTER-READABLE STORAGE MEDIUM, AND INFORMATION PROCESSING SYSTEM

CROSS-REFERENCE TO RELATED APPLICATIONS

This application is based upon and claims the benefit of priority from Japanese Patent Application No. 2017-175007, filed on Sep. 12, 2017; the entire contents of which are incorporated herein by reference.

FIELD

Embodiments described herein relate generally to an information processing device, an information processing method, a computer-readable storage medium, and an information processing system.

BACKGROUND

In recent years, a storage device whose characteristics can be changed has been known. For example, a technology of changing characteristics when a disc layout is adjusted optimally or a NAND chip is replaced according to a writing load is known.

However, conventionally, an attempt to transmit information for changing characteristics to a storage device according to a state has not been made. Due to this, the characteristics of a storage device may not be changed optimally and the performance of the storage device may decrease.

BRIEF DESCRIPTION OF THE DRAWINGS

FIG. 1 is a schematic diagram of an information processing system;

FIGS. 2A to 2C are schematic diagrams of data structures of input/output characteristics and allowable conditions;

FIG. 8 is a flowchart of a procedure of information processing;

FIG. 9 is a diagram for describing a modification;

FIG. 10 is a diagram for describing a modification;

FIG. 11 is a schematic diagram of an information processing system;

FIG. 15 is a schematic diagram of a data structure of an internal condition;

FIG. 19 is a flowchart of a procedure of information processing;

FIG. 20 is a schematic diagram of an information processing system;

FIG. 21 is a flowchart of a procedure of information processing; and

FIG. 22 is a hardware configuration diagram of an information processing device.

DETAILED DESCRIPTION

Figure 3:
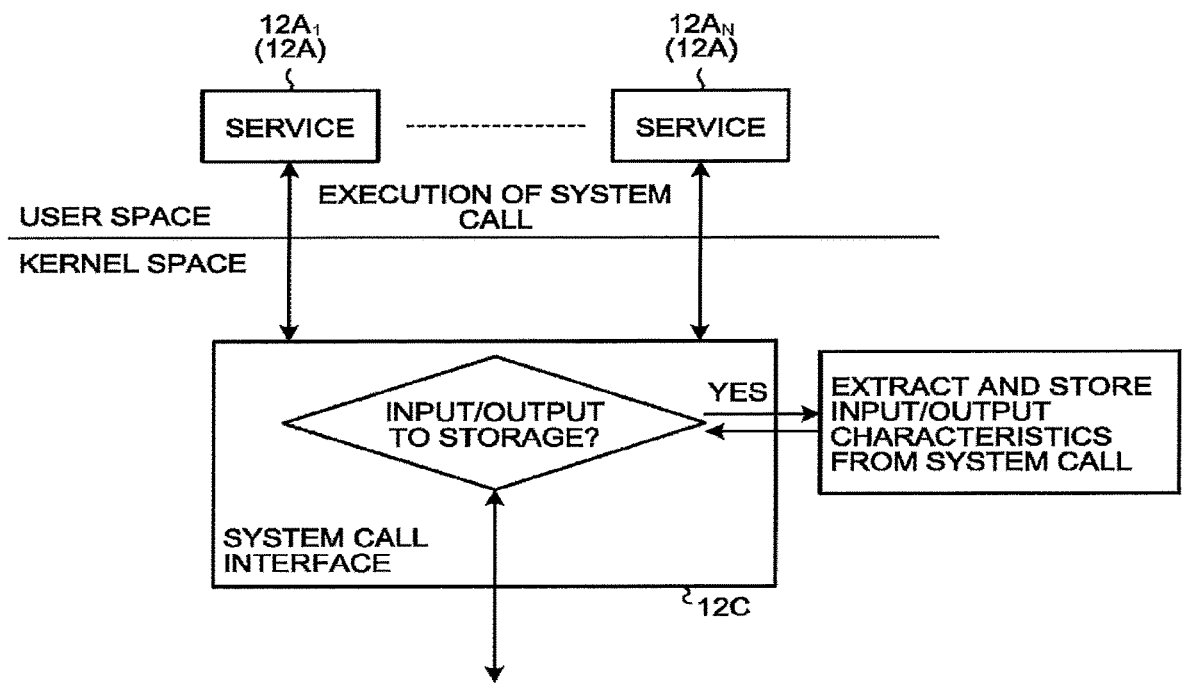
FIG. 3 is a diagram for describing an input/output characteristics monitoring process.

In general, according to one embodiment, an information processing device includes a characteristics monitoring unit, a determination unit, and a notification unit. The characteristics monitoring unit monitors characteristics information that indicates at least one of its performance and lifetime with respect to a storage device, and includes input/output characteristics. The determination unit determines, based on monitored characteristics information including the input/output characteristics, whether change instruction for changing characteristics is to be notified to the storage device. The notification unit notifies the storage device of the change instruction when the determination unit determines that the change instruction is to be notified.

Hereinafter, an information processing device, an information processing method, an information processing program, and an information processing system will be described in detail with reference to the accompanying drawings.

First Embodiment

Figure 1:
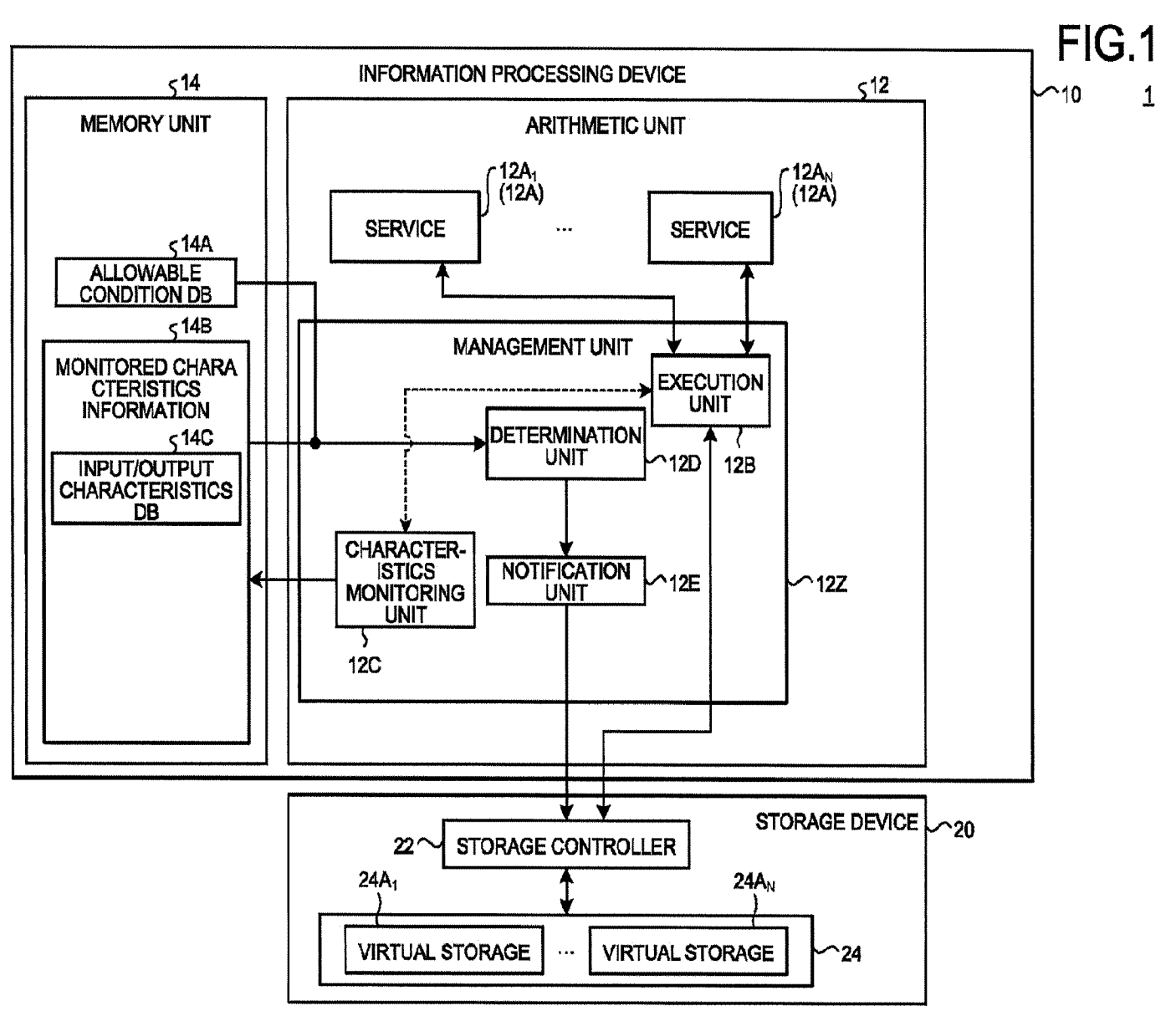

FIG. 1 is a schematic diagram illustrating an example of an information processing system 1 according to the present embodiment.

The information processing system 1 includes an information processing device 10 and a storage device 20.

The information processing device 10 and the storage device 20 are communicably connected. The information processing device 10 and the storage device 20 are connected according to interface standards such Serial AT Attachment (SATA), Serial Attached SCSI (SAS), or Peripheral Component Interconnect Express (PCIe).

The storage device 20 is a memory device. For example, the storage device 20 is a solid state drive (SSD).

In the present embodiment, the storage device 20 includes a storage controller 22 and a virtual storage 24. The virtual storage 24 includes one or a plurality of virtual storages 24A (virtual storages $24A_1$ to $24A_N$, where N is an integer of 2 or more).

The storage controller 22 controls data write and data read with respect to the virtual storage 24. In the present embodiment, the storage controller 22 changes the characteristics of the virtual storage 24 according to change instruction received from the information processing device 10.

Examples of the change of characteristics of the virtual storage 24 include adjustment of capacity allocation of the virtual storage 24, garbage collection, and wear leveling. By adjusting the capacity allocation of the virtual storage 24, the storage controller 22 can segment the virtual storage 24 into a plurality of areas so that the respective areas have different characteristics. In the present embodiment, examples of the change of characteristics of the virtual storage 24 include adjustment of allocation of internal processing or allocation of the virtual storage 24 to a service 12A, garbage collection, and wear leveling. Examples of the change of characteristics of the virtual storage 24 are not limited to the above-mentioned examples.

The information processing device 10 inputs and outputs information with respect to the storage device 20. Moreover, in the present embodiment, the information processing device 10 notifies the storage device 20 of the change instruction (the details will be described later).

The information processing device 10 is an information processing device such as a personal computer (PC), a workstation, or a server device.

The information processing device 10 includes an arithmetic unit 12 and a memory unit 14. The arithmetic unit 12 and the memory unit 14 are communicably connected.

The memory unit 14 stores various types of data. The memory unit 14 stores programs to be executed by the arithmetic unit 12 and information and the like used by the programs. In the present embodiment, the memory unit 14 stores an allowable condition DB 14A and monitored characteristics information 14B. The details of the allowable condition DB 14A and the monitored characteristics information 14B will be described later.

The memory unit 14 is a known memory medium. The memory unit 14 may be either a volatile memory (for example, DRAM) or a nonvolatile memory (for example, MRAM).

The arithmetic unit 12 has a service 12A and a management unit 122. The management unit 12Z has an execution unit 12B, a characteristics monitoring unit 12C, a determination unit 12D, and a notification unit 12E. The respective units (the service 12A, the management unit 122, the execution unit 128, the characteristics monitoring unit 12C, the determination unit 12D, and the notification unit. 12E) are realized by one or a plurality of processors, for example. For example, the respective units may be realized by causing a processor such as a central processing unit (CPU) to execute programs (that is, the units may be realized by software). The respective units may be realized by a processor (that is, hardware) such as a dedicated integrated circuit (IC). The respective units may be realized by a combination of software and hardware. When a plurality of processors are used, each processor may realize one of the respective units and may realize two or more units.

The service 12A issues various input/output requests to the storage device 20. The service 12A is an application that issues various input/output requests to the storage device 20, for example. In the present embodiment, the arithmetic unit 12 includes one or N (N is an integer of 2 or more) services 12A (services $12A_1$ to $12A_N$).

The management unit 122 manages execution of respective services 12A. As described above, the management unit 122 has the execution unit 12B, the characteristics monitoring unit 120, the determination unit 120, and the notification unit 12E.

The execution unit 12B executes data input/output operations with respect to the storage device 20 according to an input/output request with respect to the storage device 20 issued from the service 12A.

The characteristics monitoring unit 120 monitors input/output characteristics of the storage device 20. The characteristics monitoring unit 120 monitors input/output characteristics by monitoring input/output operations with respect to the storage device 20 by the execution unit 12B.

For example, the characteristics monitoring unit 120 monitors the input/output characteristics whenever the service 12A issues an input/output request. The characteristics monitoring unit 120 may monitor the input/output characteristics using an input/output operation recorded in the execution unit 12B. In this case, the execution unit 125 may record an input/output operation when an input/output operation with respect to the storage device 20 is executed.

The input/output characteristics indicate the characteristics of input/output operations with respect to the storage device 20. In other words, the input/output characteristics are utilization characteristics of the storage device 20 by the service 12A. An input/output operation with respect to the storage device 20 is executed according to an input/output request from the service 12A. Specifically, the input/output characteristics include characteristic values of a plurality of input/output characteristics types.

The input/output characteristics type indicates the type of input/output characteristics. The characteristic value is the value of input/output characteristics. The characteristic value is specified by the monitoring of the characteristics monitoring unit 120.

The input/output characteristics type includes the type of an input/output process, an input/output target, the number of input/output times, and an input/output amount, for example. The type of an input/output process is file create, file delete, file read, and file write, for example. The input/output target is identification information of an input/output target file, for example. The identification information of a file is a file name, for example. The number of input/output times is the number of file creation times, the number of file deletion times, the number of file read times, and the number of file write times, for example. The input/output amount is the number of read bytes and the number of write bytes, for example.

The execution unit 12B may execute a sequential access or a random access according to an input/output request for the storage device 20. A sequential access means that the execution unit 12B executes a successive input/output process with respect to a single file of the storage device 20. A random access means that the execution unit 12R executes an input/output process with respect to a random storage area of the storage device 20.

Therefore, the input/output characteristics type may further include information indicating whether the type of an input/output process is a sequential access or a random access and the frequency of random accesses.

For example, the characteristics monitoring unit 120 may designate an offset to specify the number of occurrences of an event such as a file open event or an event that a read position or a write position of a file is changed discontinuously as the frequency of random accesses.

When the characteristics monitoring unit 120 monitors the input/output character tics using the input/output operation recorded in the execution unit 125, the execution unit 125 may execute the following process.

For example, the execution unit 125 records an input/output operation whenever executing an input/output process with respect to the storage device 20 according to an input/output request received from the service 12A. In this case, the execution unit 125 may measure the characteristic values of respective input/output characteristics types to be described later using a counter or the like. Specifically, the execution unit 12B may record the input/output operation in units of input/output types such as the number of write times, the number of read times, the number of write bytes, and the number of read bytes.

The units of input/output operations recorded by the execution unit 12B may be an index other than the above-described indices. Moreover, the execution unit 12B may record data indicating the sum of total execution time and a difference from a previous monitoring operation by the characteristics monitoring unit 12C as an input/output operation. The characteristics monitoring unit 12C may collect an input/output operation and monitor the input/output characteristics by periodically checking the execution unit 12B. The characteristics monitoring unit 12C may collect the input/output operation using different collection methods depending on a monitoring target input/output characteristics type. Moreover, the characteristics monitoring unit 12C may collect input/output operations using a combination of a plurality of collection methods for respective monitoring target input/output characteristics types.

An input/output characteristics monitoring process by the characteristics monitoring unit 12C will be described in detail with reference to FIGS. 3 to 7.

In the present embodiment, the input/output characteristics of respective services 12A are monitored. This monitoring process may be realized by different software depending on an implementation form of the service 12A.

For example, there is a case in which the service 12A is realized as an application in a user space. In this case, as illustrated in FIG. 3, a system call interface functions as the characteristics monitoring unit 12C. Specifically, the characteristics monitoring unit 12C monitors a system call corresponding to an input/output process with respect to the storage device 20 among system calls executed by the service 12A. By this monitoring process, the characteristics monitoring unit 12C extracts input/output characteristics (read, write, the number of read bytes, and the number of write bytes) from the system call and stores the input/output characteristics in the memory unit 14 in correlation with the execution time.

Figure 4:
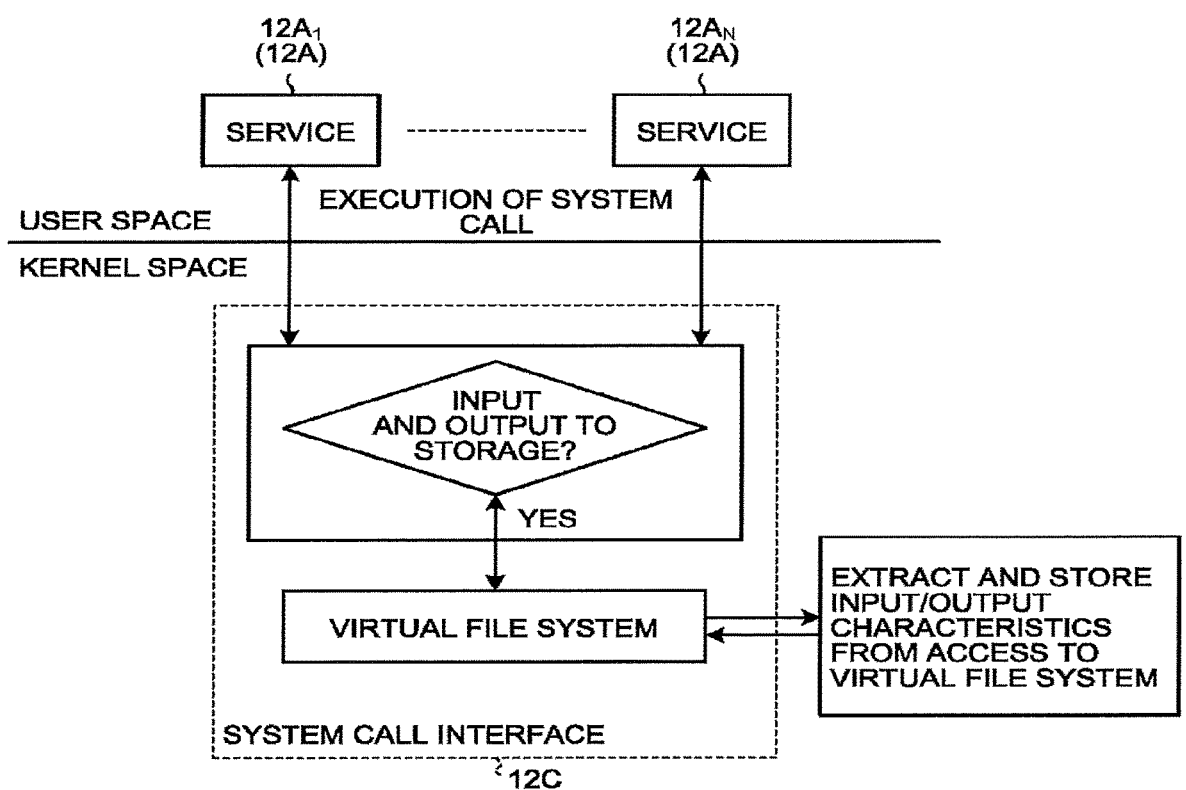
FIG. 4 is a diagram for describing an input/output characteristics monitoring process.

As illustrated in FIG. 4, a system call interface and a virtual file system may function as the characteristics monitoring unit 12C. Specifically, the characteristics monitoring unit 12C monitors an input/output process with respect to the storage device 20 in a device driver necessary for using the storage device 20, a subsystem in an OS, or a file system. The characteristics monitoring unit 12C extracts input/output characteristics from accesses to the virtual file system and stores the input/output characteristics in the memory unit 14.

Figure 5:
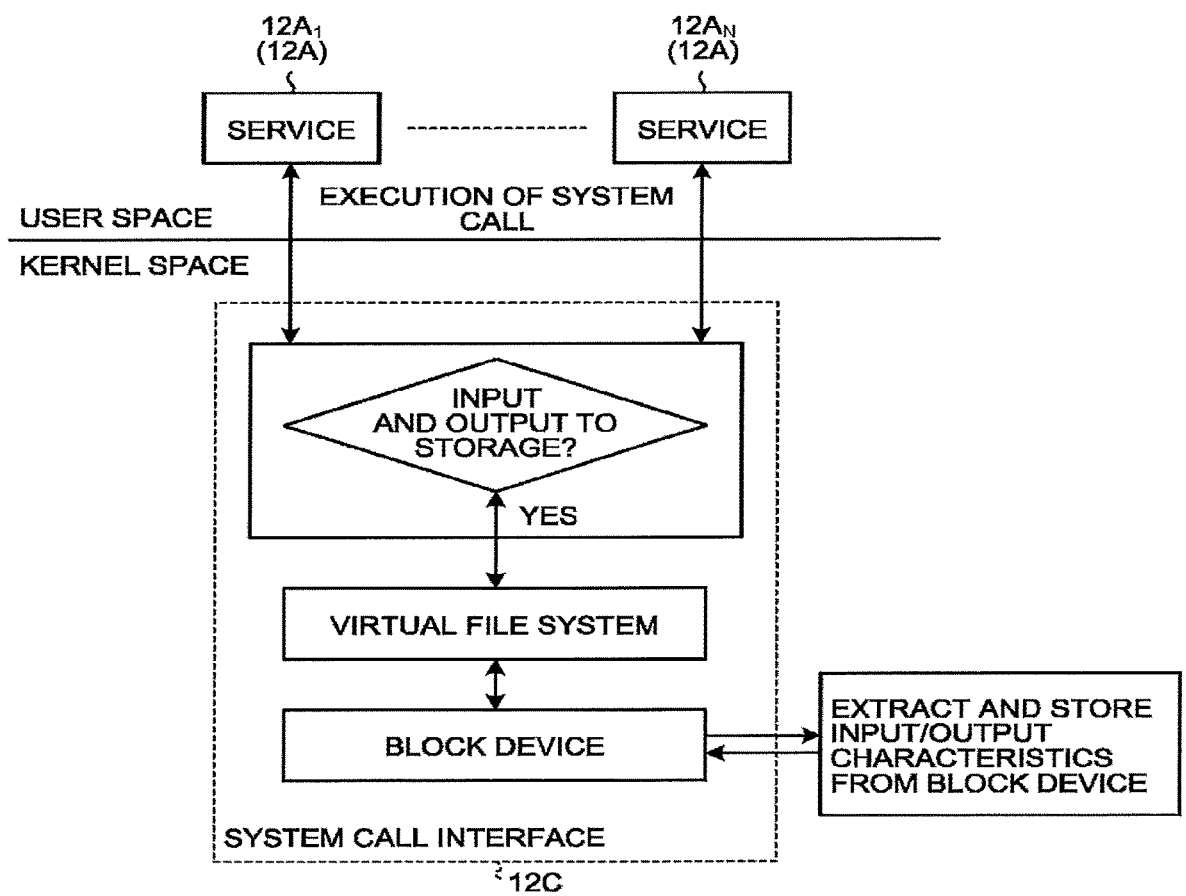
FIG. 5 is a diagram for describing an input/output characteristics monitoring process.

As illustrated in FIG. 5, a system call interface, a lower-layer file system, and a block device may function as the characteristics monitoring unit 12C. In this case, the characteristics monitoring unit 12C may extract input/output characteristics from an abstraction layer of the block device and store the input/output characteristics in the memory unit 14.

In this case, the characteristics monitoring unit 12C may monitor the input/output characteristics in a portion in which an identifier (for example, a process ID) allocated to the service 12A can be acquired. By this monitoring process, the characteristics monitoring unit 12C can store the input/output characteristics in the memory unit 14 for respective services 12A.

Figure 6:
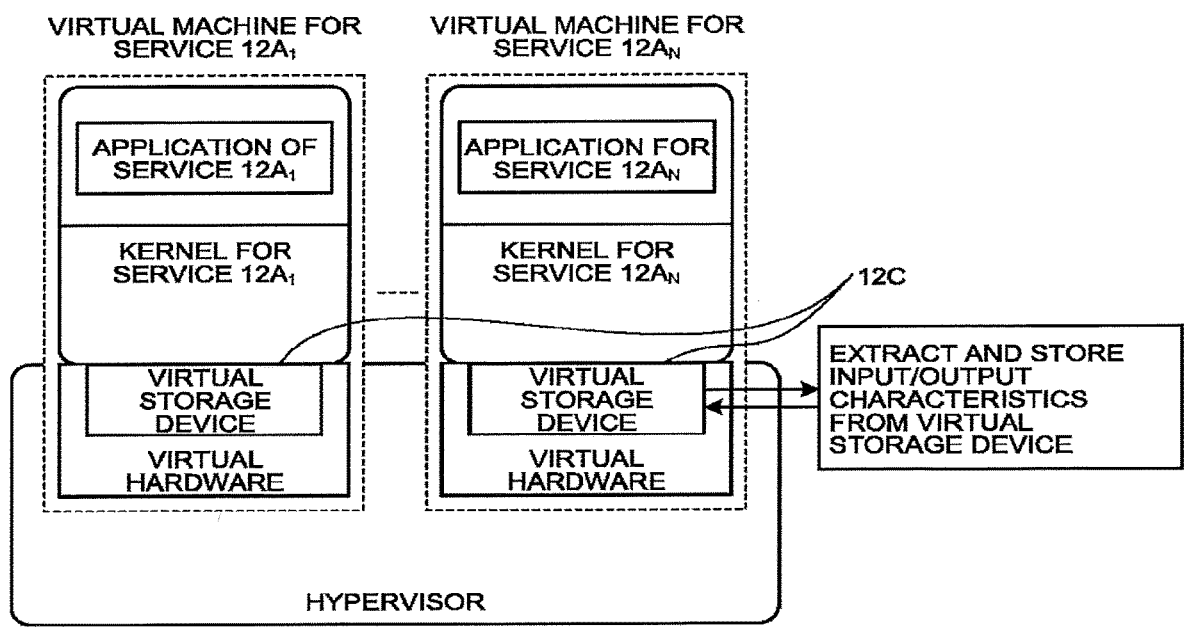
FIG. 6 is a diagram for describing an input/output characteristics monitoring process.
Figure 7:
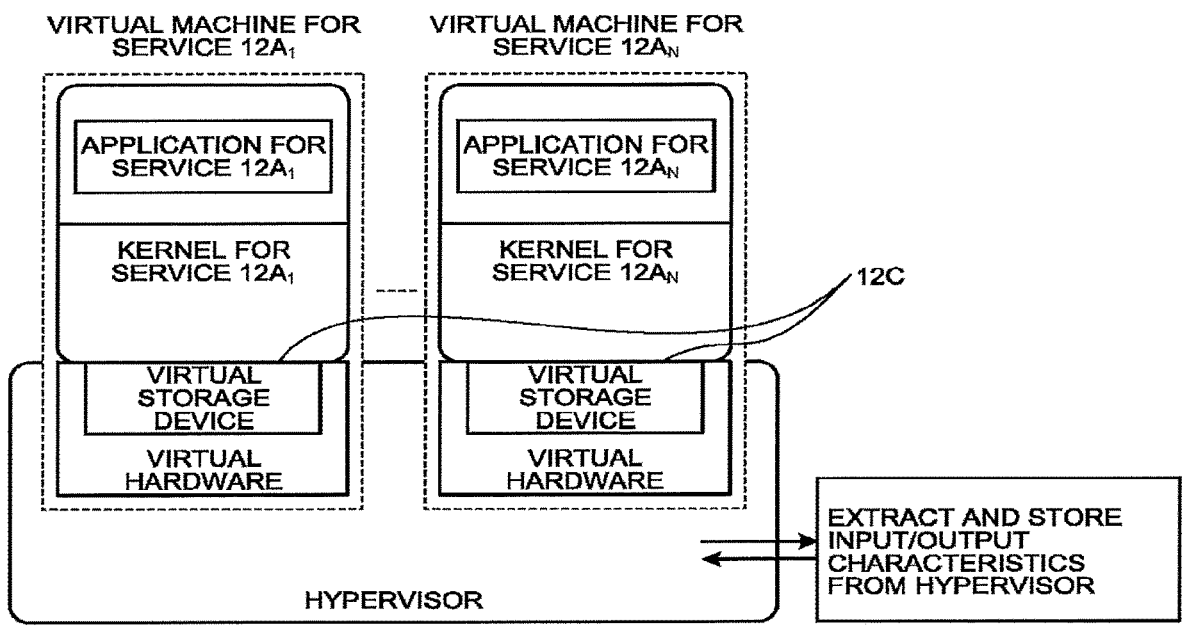
FIG. 7 is a diagram for describing an input/output characteristics monitoring process.

There is a case in which the service 12A is executed as a virtual machine of hypervisor-type virtualization or host-type virtualization. In this case, as illustrated in FIGS. 6 and 7, a hypervisor, virtual software, or a device driver for virtual devices functions as the characteristics monitoring unit 23C. A hypervisor realizes virtual machines for services 12A (services 12A$_1$ to 12A$_N$). The characteristics monitoring unit 12C may monitor the input/output characteristics of the storage device 20 for respective virtual machines for the services 12A and store the input/output characteristics in the memory unit 14.

There is a case in which the service 12A is executed as a virtual machine of container-type virtualization. In this case, the characteristics monitoring unit 12C may monitor the input/output characteristics similarly to a case in which the service 12A is realized as an application of a user space (see FIG. 3). However, in this case, the characteristics monitoring unit 12C stores the input/output characteristics in the memory unit 14 in correlation with an identifier for identifying a container. That is, when the service 12A is executed as a virtual machine of container-type virtualization, the characteristics monitoring unit 12C may monitor characteristics information that indicates at least one of its performance and lifetime with respect to a storage device, and includes the input/output characteristics.

A method for monitoring the input/output characteristics by the characteristics monitoring unit 12C is not limited to the above-described methods. That is, the characteristics monitoring unit 12C may perform the monitoring process using any one of the above-described methods. Moreover, the characteristics monitoring unit 12C may perform a monitoring process using a method other than the above-described methods.

As described above, the characteristics monitoring unit 12C stores the monitored input/output characteristics in the memory unit 14. In the present embodiment, the characteristics monitoring unit 12C registers the input/output characteristics in monitored characteristics information 14B of the memory unit 14 for respective services 12A that issued input/output requests.

Description is continued by returning to FIG. 1. The monitored characteristics information 14B is information obtained by monitoring an input/output process with respect to the storage device 20 and the state of the information processing device 10. In the present embodiment, the monitored characteristics information 14B includes input/output characteristics. Specifically, in the present embodiment, the monitored characteristics information 14B includes an input/output characteristics DB 14C.

FIGS. 2A to 25 are schematic diagrams illustrating an example of a data structure of the input/output characteristics DB 14C and the allowable condition DB 14A. The allowable condition DB 14A will be described later.

FIG. 2A is a schematic diagram illustrating an example of a data structure of the input/output characteristics DB 14C. The input/output characteristics DB 14C is a database that correlates a service ID, an input/output characteristics, and time with each other. For example, the input/output characteristics DB 14C is a relational DB or a time-series DB.

The input/output characteristics DB 14C is not limited to an advanced database. For example, the input/output characteristics DB 14C may be configured as simple list, a ring buffer, a set of temporary variables, or the like from the view point of reducing a usage rate of the memory unit 14 and simplifying implementation thereof. Moreover, the input/output characteristics DB 14C may be constructed on a file stored in a location different from the memory unit 14.

The service ID is identification information of the service 12A. As described above, the input/output characteristics indicate the characteristic values of respective input/output characteristics types. The time indicates the time point at which the corresponding input/output characteristics are obtained.

In the present embodiment, the characteristics monitoring unit 12C registers the input/output characteristics with respect to the storage device 20, of the service 12A identified by the service ID in the input/output characteristics DB 14C of the memory unit 14 for respective service IDs.

The characteristics monitoring unit 120 may perform a manipulation process on the characteristic values of respective input/output characteristics types, indicated by the monitored input/output characteristics and then register the processed characteristic values in the input/output characteristics DB 14C.

For example, the characteristics monitoring unit 12C performs a manipulation process on the characteristic values indicated by the monitored input/output characteristics for respective input/output characteristics types.

The manipulation process is a process of calculating any one of a largest value, a smallest value, an average value, a histographic value, the number of accesses per unit time for a single file, a distribution of the numbers of read and write bytes per unit time for a single file, a time interval of trend of input/output characteristics for a single file, and a time interval of trend of input/output characteristics based on an input/output request from a specific service 12A. The distribution of the number of read or write bytes is represented by the ratio of the numbers of read and write bytes for a single file, for example.

The characteristics monitoring unit 12C may perform a manipulation process for respective services 12A. In the present embodiment, the characteristics monitoring unit 12C performs the manipulation process on the characteristic values indicated by the monitored input/output characteristics for individual services 12A.

The characteristics monitoring unit 12C may register the values obtained by the manipulation process in the input/output characteristics DB 14C for respective service IDs and respective input/output characteristics types as the characteristic values.

Description is continued by returning to FIG. 1. The determination unit 12D determines whether the change instruction for changing characteristics is to be notified to the storage device 20 on the basis of the monitored characteristics information 14B including the input/output characteristics. The determination unit 12D performs determination periodically independently from other functional units.

The determination unit 12D determines that the change instruction is to be notified when it is determined that an input/output process with respect to the storage device 20 is not appropriate for the present assumed characteristics of the storage device 20 on the basis of the monitored characteristics information 14B.

There may be a case in which the input/output characteristics are not sufficient for the determination process. In this case, the determination unit 12D calculates deficient input/output characteristics if calculable from the memory unit 14. For example, the determination unit 12D may perform the manipulation process and calculate the value after the manipulation process as the characteristic values. Specifically, the determination unit 12D calculates an average value of the monitored characteristic values with respect to a period required for the determination.

On the other hand, when calculation is not possible, the determination unit 12D transmits a monitor request to the characteristics monitoring unit 12C and acquires input/output characteristics from the characteristics monitoring unit 12C.

In the present embodiment, the determination unit 12D determines whether the chance instruction is to be notified using the input/output characteristics registered in the input/output characteristics DB 14C and the allowable condition DB 14A.

The allowable condition DB 14A is a database that defines allowable conditions for trend of input/output characteristics with respect to the storage device 20. A data format of the allowable condition DB 14A is not limited to a database.

FIG. 28 is a schematic diagram illustrating an example of a data structure of the allowable condition DB 14A.

The allowable condition DB 14A is a database that correlates a service ID, allowable conditions, and a setting value with each other.

In the present embodiment, the allowable conditions indicate an allowable range of characteristic values of the storage device 20 for respective services 12A and respective input/output characteristics types. The allowable range is represented by an allowable lower limit and an allowable upper limit. Specifically, it is assumed that the characteristic value is a manipulated value. In this case, an allowable range corresponding to an input/output characteristics type of "the number of creation times" is an allowable range of the number of creation times per unit time of the service 12A identified by the corresponding service ID.

As illustrated in FIG. 2B, an allowable range for one input/output characteristics type may be a value that is continuous between a plurality of services 12A. Moreover, as illustrated in FIG. 2C, an allowable range for one input/output characteristics type may have a portion that is discontinuous between a plurality of services 12A.

Description is continued by returning to FIG. 1. The determination unit 120 determines that the change instruction is to be notified when the monitored characteristics information 14B monitored trend of the characteristics does not satisfy at least a portion of the allowable conditions of trend of input/output characteristics with respect to the storage device 20.

Specifically, the determination unit 120 reads the input/output characteristics DB 14C included in the monitored characteristics information 14B. The determination unit 12C determines whether the characteristic value illustrated in the input/output characteristics DB 14C is outside the range of the corresponding allowable range in the allowable condition DB 14A with respect to the respective service IDs and the respective input/output characteristics types registered in the input/output characteristics DB 14C. In the following description, being outside the range of the allowable range is sometimes referred to as being outside the allowable range. Moreover, being within the range of the allowable range is sometimes referred to as being within the allowable range.

The determination unit 12D determines that the change instruction is to be notified when the input/output characteristics type having the characteristic value being outside the allowable range is included in the input/output characteristics DB 14C.

In other words, the determination unit 12D determines that an input/output process with respect to the storage device 20 is not appropriate for the present assumed characteristics of the storage device 20 when the characteristic value monitored by the characteristics monitoring unit 12C is outside the allowable range of the storage device 20. Moreover, the determination unit 12D determines that the change instruction is to be notified when it is determined that the input/output process is not appropriate.

The determination unit 12D may determine whether the change instruction is to be notified on the basis of the number of services 12A provided by the arithmetic unit 12.

The arithmetic unit 12 may change a physical computer that operates the service 12A or increase or decrease the number of virtual computers (services 12A) according to a CPU usage rate or the demand of the service 12A. In such a case, the number of services 12A that affect the characteristics of the storage device 20 varies.

Therefore, the determination unit 12D may determine that an input/output process with respect to the storage device 20 is not appropriate for the present assumed characteristics of the storage device 20 when an absolute number of services 12A (virtual computers) in operation is changed by a threshold or more by the arithmetic unit 12 or the number of services 12A (virtual computers) in operation is equal to or larger than a threshold. The determination unit 12D determines that the change instruction is to be notified when it is determined that the input/output process is not appropriate.

In the present embodiment, an embodiment in which the determination unit 12D notifies the change instruction when the characteristic value monitored by the characteristics monitoring unit 12C is outside the allowable range of the storage device 20 is described as an example.

In the present embodiment, the determination unit 12D determines for respective services 12A (service IDs) whether an input/output characteristics type having a characteristic value being outside the allowable range is included in the input/output characteristics DB 14C. The determination unit 12D determines that the change instruction is to be notified to the service 12A including the input/output characteristics type having the characteristic value being outside the allowable range.

The determination unit 12D generates the change instruction when it is determined that the change instruction is to be notified.

The change instruction is information for changing the characteristics of the storage device 20. In other words, the change instruction is information used for the storage device 20 to change characteristics.

In the present embodiment, the change instruction includes setting values within the allowable range, of the input/output characteristics type outside the allowable range of the storage device 20. In other words, the change instruction includes setting values of the input/output characteristics type having the characteristic value outside the allowable range. The change instruction includes a setting value to make recovered the characteristics value that falls outside of an allowable range with respect to the input/output characteristics type.

The setting value is a value within the allowable range corresponding to the input/output characteristics type of the allowable condition DB 14A. Specifically, the setting value is a value within the allowable range, corresponding to the service ID and the input/output characteristics type, of the allowable condition DB 14A.

The setting value may be a value for adjusting the characteristics of the storage device 20 so that the corresponding characteristic value within the allowable range is obtained in the allowable condition DB 14A. In this case, the determination unit 12D may generate a value for the adjustment using the information stored in the memory unit 14 and use the value as the setting value.

The determination unit 12D may use the characteristic value determined to be outside the allowable range as the setting value.

In the present embodiment, a case in which the setting value is a value within the allowable range corresponding to the input/output characteristics type in the allowable condition DB 14A will be described.

In the present embodiment, as described above, the setting value is registered in advance in the allowable condition DB 14A in correlation with the allowable conditions. Due to this, in the present embodiment, the determination unit 12D specifies the input/output characteristics type having the characteristic value outside the allowable range among the input/output characteristics types illustrated in the input/output characteristics DB 14C. The determination unit 12D reads the corresponding setting value from the allowable condition DB 14A with respect to the specified input/output characteristics type. By this process, the determination unit 12D generates a setting value within the allowable range, corresponding to the input/output characteristics type having the characteristic value outside the allowable range.

In the present embodiment, the determination unit 12D generates the change instruction for respective services 12A. Due to this, the determination unit 12D specifies the input/output characteristics type having the characteristic value outside the allowable range among the input/output characteristics types illustrated in the input/output characteristics DB 14C for respective services 12A. The determination unit 12D reads the corresponding setting value from the allowable condition DB 14A with respect to the specified input/output characteristics type for respective services 12A. By this process, the determination unit 12D generates the setting value within the allowable range, corresponding to the input/output characteristics type having the characteristic value outside the allowable range for respective services 12A.

The determination unit 12D generates the change instruction including the setting values for respective services 12A and respective input/output characteristics types. That is, the determination unit 12D generates, for respective services 12A, the change instruction including the setting value within the allowable range, of the input/output characteristics type having the characteristic value outside the allowable range.

When the determination unit 122 determines that the change instruction is to be notified, the notification unit 12E notifies the storage device 20 of the change instruction. In the present embodiment, the notification unit 12E notifies the storage device 20 of the change instruction for respective services 12A.

For example, the notification unit. 12E transmits the service ID of the service 12A and the change instruction generated for the service 12A identified by the service ID to the storage device 20 in correlation. The notification unit 12E may perform a process of sharing the service ID with tree storage device 20 before transmitting the change instruction. The notification unit 12E may notify the storage device 20 of the corresponding change instruction using the shared service ID.

The storage controller 22 of the storage device 20 changes the characteristics of the virtual storage 24 using the received change instruction so that the characteristics satisfy the allowable conditions. The storage controller 22 may change the characteristics using a known method.

For example, the storage device 20 performs allocation of an internal processing or allocation of the virtual storage 24 to the service 12A, garbage collection, wear leveling, and the like using the change instruction so that the characteristics satisfy the allowable conditions of the storage device 20.

Next, an example of a procedure of information processing executed by the information processing device 10 of the present embodiment will be described. FIG. 8 is a flowchart illustrating an example of a procedure of information processing executed by the information processing device 10 of the present embodiment. It is assumed that the execution unit 122 executes an input/output process with respect to the storage device 20 whenever an input/output request is received from the service 12A.

First, the characteristics monitoring unit 12C monitors the input/output characteristics of the storage device 20 (step S100). For example, the characteristics monitoring unit 12C monitors the input/output characteristics whenever the service 12A issues an input/output request. The characteristics monitoring unit. 12C may monitor the input/output characteristics by monitoring the input/output operation recorded by the execution unit 12B whenever the execution unit 12B executes an input/output process corresponding to the input/output request. In this case, the execution unit 12B records the input/output operation whenever executing an input/output process with respect to the storage device 20. The characteristics monitoring unit 12C may monitor the input/output characteristics using the recorded input/output operation.

Subsequently, the characteristics monitoring unit 12C stores the input/output characteristics monitored in step S100 in the memory unit 14 (step S102). In the present embodiment, the characteristics monitoring unit 12C registers the input/output characteristics with respect to the storage device 20, of the service 12A in the input/output characteristics DB 140 of the memory unit 14 for respective service 12A.

Subsequently, the determination unit 12D determines whether the change instruction is to be notified to the storage device 20 (step S104). As described above, the determination unit 12D performs the determination of step S104 by determining whether the input/output characteristics satisfy at least a portion of the allowable conditions of the input/output process of the storage device 20.

When the input/output characteristics satisfy all allowable conditions, a negative determination result is obtained (step S104: No), and the flow returns to step S100. On the other hand, when the input/output characteristics do not satisfy at least a portion of the allowable conditions, a positive determination result is obtained (step S104: Yes), and the flow proceeds to step S106.

In step S106, the determination unit 12D generates the change instruction (step S106). For example, the determination unit 12D generates, for respective services 12A, the change instruction including the setting value within the allowable range, of the input/output characteristics type whose characteristic value falls outside the allowable range of the storage device 20.

Subsequently, the notification unit 12E notifies the storage device 20 of the change instruction generated by step S106 (step S108). For example, the notification unit 12E transmits the service ID and the change instruction generated for the service 12A identified by the service ID to the storage device 20 in correlation.

The storage controller 22 of the storage device 20 having received the change instruction changes the characteristics of the virtual storage 24 using the setting value indicated in the received change instruction so that the characteristics satisfy the allowable conditions of the storage device 20. For example, storage device 20 performs adjustment of the capacity allocation of the virtual storage 24, garbage collection, wear leveling, and the like using the change instruction so that the characteristics satisfy the allowable conditions of the storage device 20. In this way, the present routine ends.

As described above, the information processing device 10 of the present embodiment includes the characteristics monitoring unit 12C, the determination unit 12D, and the notification unit 12E. The characteristics monitoring unit 12C monitors characteristics information that indicates at least one of its performance and lifetime with respect to a storage device 20, and includes the input/output characteristics. The determination unit 12D determines whether the change instruction for changing the characteristics of the storage device 20 is to be notified on the basis of the monitored characteristics information including the input/output characteristics. When it is determined that the change instruction is to be notified, the notification unit 12E notifies the storage device 20 of the change instruction.

In this way, the information processing device 10 of the present embodiment determines whether the change instruction for changing the characteristics is to be notified to the storage device 20 on the basis of the monitored characteristics information including the input/output characteristics with respect to the storage device 20 and notifies the storage device 20 of the change instruction.

Due to this, the storage device 20 having received the change instruction can receive the change instruction for changing the characteristics depending on the input/output characteristics. Therefore, the storage device 20 can change the characteristics using the received change instruction.

Therefore, the information processing device 10 of the present embodiment can suppress a decrease in the performance of the storage device 20.

First Modification

In the above-described embodiment, a case in which the input/output characteristics type is the type of an input/output process, an input/output target, the number of input/output times, and the input/output amount, for example, has been described. Moreover, a case in which the input/output target is identification information of an input/output target file, for example, and the identification information of the file is a file name, for example, has been described.

However, the input/output characteristics type may be meta-information associated with the input/output target file. The meta-information is the type of a file, the use of a file, or the like. The characteristics monitoring unit 12C may infer the meta-information from the file name and the file size of the input/output target file and use the meta-information as the input/output characteristics type and the characteristic value.

For example, a character string indicating the type of a file is usually included at the end of a file name. In this case, the characteristics monitoring unit 12C may infer the type of a file by analyzing the file name. Moreover, meta-information is sometimes appended to the input/output target file. In this case, the characteristics monitoring unit 12C may infer the meta-information by analyzing the meta-information appended to the input/output target file and use the meta-information as the input/output characteristics type and the characteristic value.

Second Modification

In the above-described embodiment, an embodiment in which the allowable range in the allowable condition DB 14A (see FIG. 2B) is determined for respective input/output characteristics types so that the allowable ranges do not overlap between the services 12A.

The allowable ranges of respective services 12A may partially overlap between the input/output characteristics types.

FIG. 9 is a diagram for describing this modification. As illustrated in FIG. 9, some of the allowable ranges may overlap for a plurality of input/output characteristics types (for example, $X_1$ and $X_2$). In this case, an overlapping range of these allowable ranges may be determined in advance in the setting value ranges A to G). Specifically, for example, the allowable condition DB 14A illustrated in FIG. 10 may be stored in advance in the memory unit 14.

Second Embodiment

In the present embodiment, an embodiment in which the service information of the service 12A is also monitored will be described. In the following description, the same functional units and data will be denoted by the same reference numerals, and the detailed description thereof is sometimes omitted.

FIG. 11 is a schematic diagram illustrating an example of an information processing system 1A according to the present embodiment.

The information processing system 1A includes an information processing device 10A and a storage device 20. The information processing system 1A is the same as the information processing system 1 of the first embodiment except that the information processing system 1A includes the information processing device 10A instead of the information processing device 10.

The information processing device 10A performs an input/output process with respect to the storage device 20. The information processing device 10A includes an arithmetic unit 30 and a memory unit 31. The arithmetic unit 30 and the memory unit 31 are communicably connected.

The memory unit 31 stores an allowable condition DB 31A and monitored characteristics information 31B instead of the allowable condition DB 14A and the monitored characteristics information 14B. The monitored characteristics information 310 includes an input/output characteristics DB 14C and a service information DB 31D. The input/output characteristics DB 14C is the same as that of the first embodiment. The details of the allowable condition DB 31A and the service information DB 31D will be described later.

The arithmetic unit 30 has a service 12A and a management unit 30Z. The service 12A is the same as that of the first embodiment. The management unit 30Z includes the execution unit 12B, the characteristics monitoring unit 12C, the service monitoring unit 30F, the determination unit 30D, and the notification unit 12E. These respective units are realized by one or a plurality of processors, for example. For example, the respective units may be realized by causing a processor such as a CPU to execute programs (that is, the units may be realized by software). The respective units may be realized by a processor (that is, hardware) such as a dedicated IC. The respective units may be realized by a combination of software and hardware. When a plurality of processors are used, each processor may realize one of the respective units and may realize two or more units.

The execution unit 12B and the characteristics monitoring unit 12C are the same as those of the first embodiment.

The service monitoring unit 30F monitors the service information. The service monitoring unit 30F monitors the service information in parallel with monitoring of the input/output characteristics by the characteristics monitoring unit 12C. The service monitoring unit 30F monitors the service information of respective services 12A by monitoring the services 1A (services 12A$_1$ to 12A$_N$).

For example, the service monitoring unit 30F passively monitors the operation of the service 12A. In this case, the service monitoring unit 30F receives notification of the service information from the service 12A. For example, the service monitoring unit 30F provides a dedicated system call or an application programming interface (API) for information exchange. The service monitoring unit 30F may acquire service information from the service 12A when the service 12A executes these operations.

The service monitoring unit 30F may monitor the service information by actively exchanging information with the service 12A. That is, the service monitoring unit 30F may acquire the service information by always monitoring the operations of the respective services 12A. In this case, the service monitoring unit 30F acquires the operation of the service 12A and information related to the operation as the service information by a passive method such as a method of monitoring the system call similarly to the characteristics monitoring unit 12C. That is, in this case, the service monitoring unit 30F acquires the service information by receiving the service information from the service 12A.

The service information is information on the service 12A. In other words, the service information is information on the service 12A and is information useful for changing the characteristics of the storage device 20.

Specifically, the service information is the characteristics of a file stored in the storage device 20, of a target that the service 12A accesses according to an input/output request, meta-information of the file, an input/output request for the storage device 20 by the service 12A, and the like.

The characteristics of a file are an expiration date of a file, for example. The expiration date indicates a retention period of a file. The characteristics of a file may be any one of a longest expiration date of a file, a shortest expiration date, and an average expiration date.

The meta-information is the same as that of the first embodiment. The service monitoring unit 30F may acquire the meta-information of a file by collecting information from the service 12A via API. By acquiring the meta-information of a file via API, the service monitoring unit 30F can easily acquire meta-information of a file having a file name that does not satisfy existing restrictions.

The service monitoring unit 30F acquires an input/output request for the storage device 20 directly from the service 12A. Due to this, before the execution unit 12B executes an input/output process corresponding to the input/output request with respect to the storage device 20, the service monitoring unit 30F can acquire an input/output request for the storage device 20.

The service monitoring unit 30F stores the monitored service information in the memory unit 31. In the present embodiment, the service monitoring unit 30F registers the service information in the monitored characteristics information 31B of the memory unit 31 for respective services 12A.

The monitored characteristics information 31B is information obtained by monitoring an input/output process with respect to the storage device 20 and the state of the information processing device 10A. In the present embodiment, the monitored characteristics information 31B includes input/output characteristics and service information. That is, the monitored characteristics information 31B is the same as the monitored characteristics information 14B of the first embodiment except that the monitored characteristics information 31B further includes service information in addition to the input/output characteristics. Specifically, the monitored characteristics information 31B includes an input/output characteristics DB 14C and a service information DB 31D. The input/output characteristics DB 14C is the same as that of the first embodiment.

The service information DB 31D is a database that registers the service information. A data format of the service information DB 31D is not limited to a database.

Figures 12, 13:
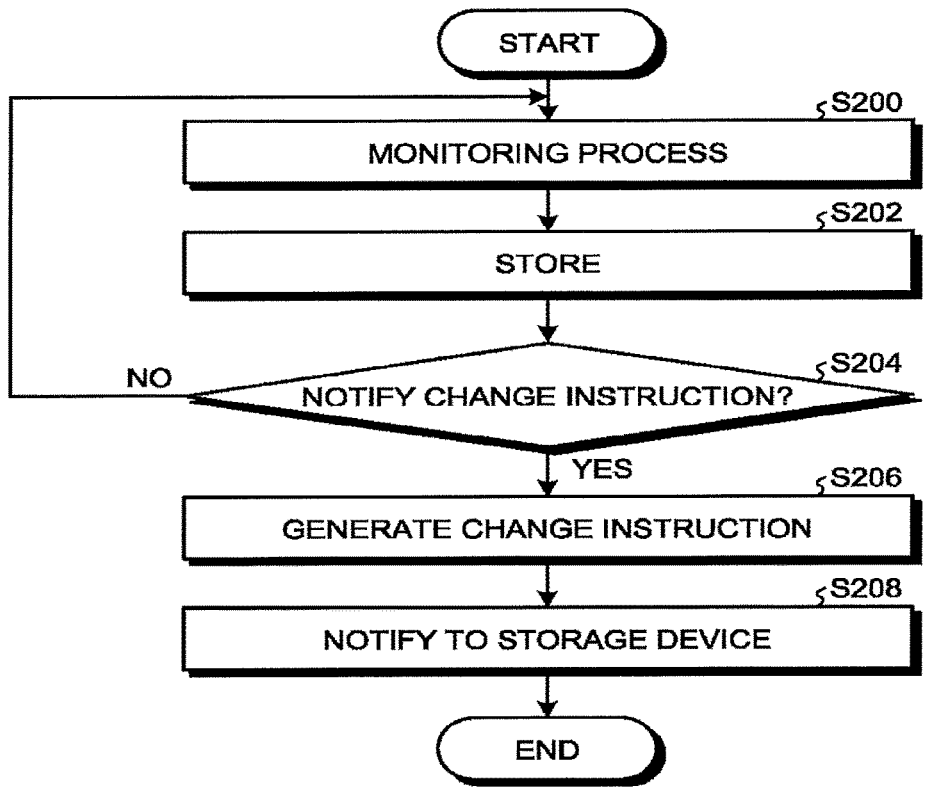
FIG. 12 is a schematic diagram of a data structure of service information.
FIG. 13 is a flowchart of a procedure of information processing.

FIG. 12 is a schematic diagram illustrating an example of a data structure of the service information DB 31D. In the present embodiment, the service information DB 31D is a database that registers the service information for respective services 12A. Specifically, the service information DB 31D correlates a service ID, the service information, and a time point with each other.

The service information includes a service type and the value of the service type. The service type is the type of the service information. The service type is an expiration date of a file, meta-information (the type of a file, the use of a file, and the like), the content of an input/output request, and the like. The value is a value obtained by monitoring the service 12A, indicated by the corresponding service type. The time point indicates a time point at which the corresponding service information was monitored.

The value corresponding to the service type in the service information DB 31D may be a value obtained by performing a manipulation process on a value that the service monitoring unit 30F acquired from the service 12A. For example, the service monitoring unit 30F may register an average value, a maximum value, a minimum value, or the like in a specific period in the service information DB 31D as the value corresponding to each service type.

As described above, in the present embodiment, the service monitoring unit 30F registers the service information for respective services 12A (service IDs) in the service information DB 31D of the memory unit 31.

Next, the determination unit 30D will be described. Similarly to the determination unit 12D of the first embodiment, the determination unit 30D determines whether the change instruction for changing the characteristics of the storage device 20 is to be notified to the storage device 20 on the basis of the monitored characteristics information 31B.

In the present embodiment, the determination unit 30D determines whether the change instruction is to be notified on the basis of both the input/output characteristics and the service information. That is, the determination unit 30D determines whether the change instruction is to be notified on the basis of the monitored characteristics information 31B further including the service information.

In the present embodiment, the determination unit 30D determines whether the change instruction is to be notified using the input/output characteristics registered in the input/output characteristics DB 140, the service information registered in the service information DB 31D, and the allowable condition DB 31A.

The allowable condition DB 31A is a database that defines the allowable conditions of the service information and the input/output process with respect to the storage device 20. The data format of the allowable condition DB 31A is not limited to a database.

A data structure of the allowable condition DB 31A is the same as that of the allowable condition DB 14A (see FIG. 28). That is, the allowable condition DB 31A is a database that correlates a service ID, an allowable condition, and a setting value with each other. However, the allowable condition DB 31A may indicate the allowable ranges of the characteristic value and the service type value of the storage device 20 for respective services 12A, respective input/output characteristics types, and respective service types. That is, the allowable condition DB 31A may indicate the allowable range and the setting value of the characteristic value of the storage device 20 for respective services 12A and respective input/output characteristics types and the allowable range and the setting value of the service type value of respective services 12A and respective service types.

The allowable range and the setting value may be determined in advance for respective services 12A and may be registered in advance in the allowable condition DB 31A similarly to the first embodiment.

The determination unit 30D may determine that the change instruction is to be notified when it is determined that the input/output process for the storage device 20 is not appropriate for the present assumed characteristics of the storage device 20 similarly to the first embodiment. Specifically, the determination unit 30D may determine that the change instruction is to be notified when information that does not satisfy at least a portion of the allowable conditions is included in the monitored characteristics information 31B.

For example, the determination unit 30D determines that the change instruction is to be notified when the expiration date monitored as the service information is outside the allowable ranges of the corresponding service ID and the corresponding service type value in the allowable condition DB 31A.

The determination unit 30D determines whether each of the respective types of values (the characteristic values of the input/output characteristics types and the service type values) included in the monitored characteristics information 31B is outside the corresponding allowable range in a similar manner. The determination unit 30D determines that the change instruction is to be notified when at least one type (at least one of one or a plurality of input/output characteristics types and one or a plurality of service types) has a value outside the corresponding allowable range.

Therefore, the determination unit 30D determines that the change instruction is to be notified at a larger number of timings than that of the first embodiment.

Specifically, the determination unit 30D determines that the change instruction is to be notified at a larger number of timings than that of the first embodiment when the service monitoring unit 30F acquires the service information, when the characteristics monitoring unit 12C acquires the input/output characteristics, and when the characteristic value or the value is outside the allowable range, for example.

The determination unit 30D generates change instruction when it is determined that the change instruction is to be notified.

In the present embodiment, the determination unit 30D includes the setting value within the allowable range, of the input/output characteristics type whose characteristic value falls outside the allowable range of the storage device 20 and the setting value within the allowable range, of the service type whose value falls outside the allowable range of the storage device 20. In other words, in the present embodiment, the change instruction includes the setting value of the input/output characteristics type having the characteristic value outside the allowable range and the setting value of the service type having a value outside the allowable range.

The setting value is a value within the allowable range of the corresponding input/output characteristics type and the corresponding service type similarly to the first embodiment. In the present embodiment, the setting value is registered in advance in the allowable condition DB 31A.

Due to this, similarly to the determination unit 12D of the first embodiment, the determination unit 30D reads the setting values corresponding to a combination of the service ID and the input/output characteristics type and a combination of the service ID and the service type from the allowable condition DB 31A with respect to the service ID of the monitored characteristics information 31B including the input/output characteristics type having the characteristic value outside the allowable range and the service type having the value outside the allowable range. By this reading process, the determination unit 30D generates the change instruction including the setting values within the allowable range, corresponding to the input/output characteristics type outside the allowable range and the service type value outside the allowable range for respective services 12A.

The notification unit 12E is the same as the first embodiment. That is, the notification unit 12E notifies the storage device 20 of the change instruction for respective services 12A when the determination unit 30D determines that the change instruction is to be notified.

The storage controller 22 of the storage device 20 changes the characteristics of the virtual storage 24 using the received change instruction so that the characteristics satisfy the allowable conditions.

The notification unit 12E may notify the storage device 20 of the change instruction for respective types of setting values (one or a plurality of input/output characteristics types and one or a plurality of service types). That is, the notification unit 12E may notify the storage device 20 of data that correlates the setting value and the type of the setting value with each other as the change instruction.

In this case, the storage device 20 may change the characteristics by allocating the storage areas in a format of X % (X bytes) and Y % (Y bytes) for respective types of setting values.

Next, an example of a procedure of information processing executed by the information processing device 10A of the present embodiment will be described. FIG. 13 is a flowchart illustrating an example of a procedure of information processing executed by the information processing device 10A of the present embodiment. It is assumed that the execution unit 120 executes an input/output process with respect to the storage device 20 whenever an input/output request is received from the service 12A.

First, the characteristics monitoring unit 12C and the service monitoring unit 30F executes a monitoring process (step S200). In step S200, the input/output characteristics monitoring process by the characteristics monitoring unit 12C and the service information monitoring process by the service monitoring unit 30F are executed in parallel.

Subsequently, the characteristics monitoring unit 12C and the service monitoring unit 30F executes a process of storing data in the memory unit 31 (step S202). In step S202, the characteristics monitoring unit 12C stores the monitored input/output characteristics in the memory unit 31. Moreover, the service monitoring unit 30F stores the monitored service information in the memory unit 31.

Subsequently, the determination unit 30D determines whether the change instruction is to be notified to the storage device 20 (step S204). When a negative determination result is obtained in step S204 (step S204: No), the flow returns to step S200. On the other hand, when a positive determination result is obtained in step 3204 (step S204: Yes), the flow proceeds to step S206.

In step S206, the determination unit 300 generates change instruction (step S206). Subsequently, the notification unit 12E notifies the storage device 20 of the change instruction generated in step S206 (step S208). The storage controller 22 of the storage device 20 having received the change instruction changes the characteristics of the virtual storage 24 using the setting value indicated in the received change instruction so that the characteristics satisfy the allowable conditions of the storage device 20. In this way, the present routine ends.

As described above, in the information processing device 10A of the present embodiment, the service monitoring unit 30E monitors the service information of the service 12A. The determination unit 30D determines whether the change instruction is to be notified on the basis of the monitored characteristics information 31B further including the service information. The notification unit 12E notifies the change instruction when it is determined that the change instruction is to be notified.

Due to this, the information processing device 10A of the present embodiment can notify the storage device 20 of the change instruction corresponding to the service information. Moreover, the information processing device 10A can notify the storage device 20 of the change instruction at a timing corresponding to the service information. Due to this, the storage device 20 can change the characteristics of the storage device 20 in a more detailed manner.

Therefore, the information processing device 10A of the present embodiment can suppress a decrease in performance of the storage device 20 in addition to the advantages of the above-described embodiment.

Moreover, the information processing device 10A of the present embodiment can determine whether the change instruction is to be notified at a larger number of timings than that of the above-described embodiment. Due to this, the storage device 20 can change the characteristics at shorter timings than that of the above-described embodiment. Moreover, the information processing device 10A can change the characteristics of the storage device 20 while suppressing influence on the service 12A.

Since the information processing device 10A notifies the change instruction corresponding to the service information, the storage device 20 can change the characteristics more efficiently.

Specifically, since the information processing device 10A notifies the change instruction based on monitoring of the expiration date, the storage device 20 can set a period for which the file is to be stored. Moreover, the storage device 20 can predict a storage capacity necessary for executing the service 12A.

In the present embodiment, the information processing device 10A notifies the storage device 20 of the change instruction including the setting values within the allowable ranges of a plurality of service types and the setting values within the allowable ranges of a plurality of input/output characteristics types. Due to this, the storage device 20 can predict the necessary size of the virtual storage 24A according to the setting values of a plurality of types.

The storage device 20 may change the characteristics by adjusting the number of storage elements secured therein without changing the capacities allocated to respective services 12A.

In the present embodiment, the service monitoring unit 30F acquires an input/output request with respect to the storage device 20 directly from the service 12A. Due to this, the service monitoring unit 30F can acquire the input/output request before the execution unit 12D executes an input/output process corresponding to the input/output request with respect to the storage device 20. Therefore, the storage device 20 can receive the change instruction corresponding to the input/output request from the notification unit 12E before receiving the input/output process from the execution unit 12B.

Due to this, the storage device 20 can actively change the characteristics. That is, the storage device 20 can change the characteristics according to the received change instruction before an input/output process is performed from the service 12A via the execution unit 12B. Moreover, the storage device 20 can change the characteristics prior to and according to a change in the service information monitored by the service monitoring unit 30F.

Moreover, the notification unit 12E can notify the storage device 20 of the change instruction corresponding to the service information of the service 12A before new activation of the service 12A. Due to this, the storage device 20 can smoothly cope up with a target input/output process received from the execution unit 12B.

Third Embodiment

In the present embodiment, an embodiment in which internal condition information of the storage device 20 is further monitored will be described.

Figure 14:
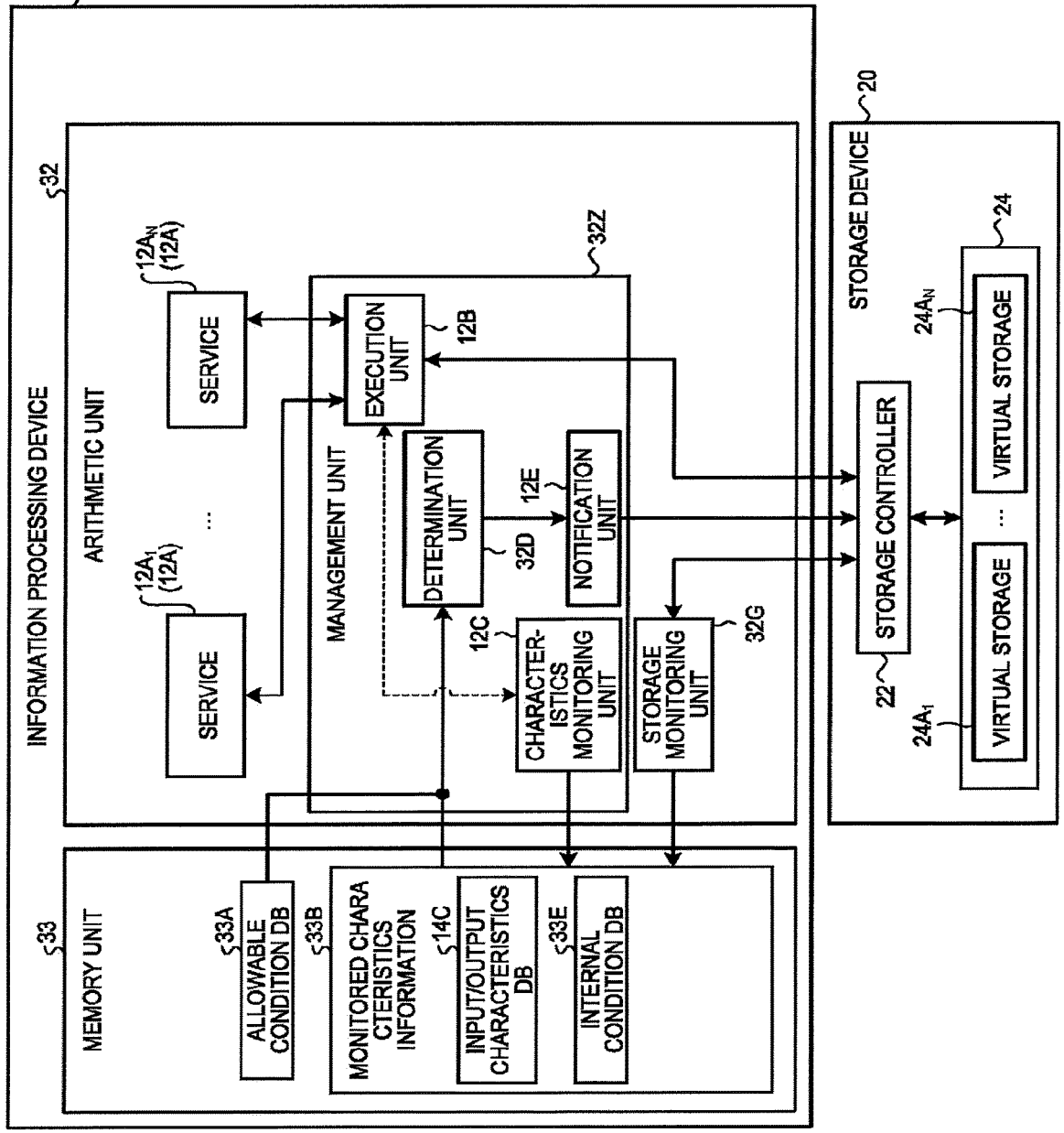
FIG. 14 is a schematic diagram illustrating an information processing system.

FIG. 14 is a schematic diagram illustrating an example of an information processing system 1B according to the present embodiment.

The information processing system 1B includes an information processing device 10B and a storage device 20. The information processing system 1B is the same as the information processing system 1 of the first embodiment except that the information processing system 1B includes the information processing device 10B instead of the information processing device 10.

The information processing device 10B performs an input/output process with respect to the storage device 20. The information processing device 10B includes an arithmetic unit 32 and a memory unit 33. The arithmetic unit 32 and the memory unit 33 are communicable connected.

The memory unit 33 stores an allowable condition DB 33A and monitored characteristics information 33B instead of the allowable condition DB 14A and the monitored characteristics information 14B. The monitored characteristics information 33B includes an input/output characteristics DB 14C and an internal condition DB 33E. The input/output characteristics DB 14C is the same as that of the first embodiment. The details of the allowable condition DB 33A and the internal condition DB 33E will be described later.

The arithmetic unit 33 includes a service 12A, a management unit 32Z, and a storage monitoring unit 32G. The service 12A is the same as that of the first embodiment. The management unit 32Z includes an execution unit 12B, a characteristics monitoring unit 12C, a determination unit 32D, and a notification unit 12E. These respective units are realized by one or a plurality of processors, for example. For example, the respective units may be realized by causing a processor such as a CPU to execute programs (that is, the units may be realized by software). The respective units may be realized by a processor (that is, hardware) such as a dedicated IC. The respective units may be realized by a combination of software and hardware. When a plurality of processors are used, each processor may realize one of the respective units and may realize two or more units.

The execution unit 12B, the characteristics monitoring unit 12C, and the notification unit 12E are the same as those of the first embodiment.

The storage monitoring unit 32G monitors the internal condition of the storage device 20. The storage monitoring unit 32G monitors the internal condition of the storage device 20 by monitoring the storage device 20.

The internal condition of the storage device 20 indicates a condition value of each internal state type. The internal state type indicates the type of an internal condition of the storage device 20. Examples of the internal state type include the number of valid storage elements, a read error rate of each storage element, an access state (the number of erasure times) of each cell, an average value of access states of a plurality of cells, and conversion information of logical/physical addresses in the storage device 20. The condition value is a value indicated by the internal state type.

The storage monitoring unit 32G monitors the internal condition by collecting the internal condition directly from the storage device 20. The condition value of reach internal state type is managed by the storage controller 22 as internal information of the storage device 20.

The storage monitoring unit 32G operates independently from the arithmetic unit 32Z and refers to the storage device 20 periodically to thereby read the internal condition. Specifically, the storage monitoring unit 32G reads the internal condition via software or a register of the storage controller 22.

The storage device 20 may manage the internal conditions of respective services 12A. In this case, it is preferable that the storage device 20 reads the internal conditions managed for respective services 12A.

The storage monitoring unit 32G stores the monitored internal condition in the memory unit 33. In the present embodiment, the storage monitoring unit 32G registers the monitored internal condition in the monitored characteristics information 33B of the memory unit 31.

The monitored characteristics information 338 is information obtained by monitoring the trend of input/output characteristics with respect to the storage device 20 and the internal condition of the storage device 20. In the present embodiment, the monitored characteristics information 33B includes the input/output characteristics and the internal condition. That is, the monitored characteristics information 33B is the same as the monitored characteristics information 14B of the first embodiment except that the monitored characteristics information 33B further includes the internal condition in addition to the input/output characteristics. Specifically, the monitored characteristics information 33B includes an input/output characteristics DB 14C and an internal condition DB 33E. The input/output characteristics DB 14C is the same as that of the first embodiment.

The internal condition DB 33E is a database that registers the internal condition. The internal condition DB 33E is not limited to a database.

FIG. 15 is a schematic diagram illustrating an example of a data structure of the internal condition DB 33E. In the present embodiment, the internal condition DB 33E is a database that registers an internal condition and time. More specifically, the internal condition DB 33E is a database that correlates the internal state type, the condition value of the internal state type, and time with each other. The time is a time point at which the condition value of the corresponding internal state type was monitored.

When the internal conditions of the respective services 12A were monitored, the monitored characteristics information 33B may register the service ID, the internal condition (the internal state type and the condition value), and time in the internal condition DB 33E in correlation with each other.

Next, the determination unit 32D will be described. Similarly to the determination unit 12D of the first embodiment, the determination unit 32D determines that the change instruction is to be notified when it is determined that the input/output process with respect to the storage device 20 is not appropriate for the present assumed characteristics of the storage device 20. The determination unit 32D determines whether the change instruction for changing the characteristics of the storage device 20 is to be notified to the storage device 20 on the basis of the monitored characteristics information 33B.

In the present embodiment, the determination unit 32D determines whether the change instruction is to be notified on the basis of both the input/output characteristics and the internal condition of the storage device 20. That is, the determination unit 32D determines whether the change instruction is to be notified on the basis of the monitored characteristics information 33E further including the internal condition.

In the present embodiment, the determination unit 32D determines whether the change instruction is to be notified using the input/output characteristics registered in the input/output characteristics DB 14C, the internal condition registered in the internal condition DB 33E, and the allowable condition DB 33A.

The allowable condition DB 3A is a database that defined the allowable conditions of the input/output process with respect to the storage device 20 and the internal condition of the storage device 20. A data format of the allowable condition DB 33A is not limited to a database.

A data structure f the allowable condition DB 33A is the same as that of the allowable condition DB 14A (see FIG. 2B). That is, the allowable condition DB 33A is a database that correlates the service ID, the allowable condition, and the setting value with each other. However, the allowable condition DB 33A may indicates the allowable ranges of the characteristic value and the condition value for respective services 12A, respective input/output characteristics types, and respective internal state types.

The allowable range and the setting value may be determined in advance for respective services 12A and registered in advance in the allowable condition DB 33A similarly to the first embodiment.

For example, when the internal state type is an "access state of a cell", an allowable range of the average value of the access states of the cell is registered in the allowable range of the condition value. Moreover, a value within the allowable range and the number of allocated cells to control the storage device 20 so that the value falls within the allowable range are registered in advance in the setting value corresponding to the internal state type.

When the monitored characteristics information 333 monitored trend of the characteristics does not satisfy at least a portion of the allowable condition, the determination unit 32D determines that the change instruction is to be notified.

For example, the determination unit 32D determines that the change instruction is to be notified when an internal state type whose condition value does not satisfy the allowable condition (the allowable range) is included in the internal condition registered in the internal condition DB 33E.

Specifically, the determination unit 32D determines whether each of the types f values (the characteristic value of the input/output characteristics type and the condition value of the internal state type) included in the monitored characteristics information 33B is outside the corresponding allowable range. Moreover, the determination unit 32D determines that the change instruction is to be notified when at least one type (at least one of one or a plurality of input/output characteristics types and one or a plurality of internal state types) has a value outside the corresponding allowable range.

Therefore, the determination unit 32D determines that the change instruction is to be notified at a larger number of timings than that of the first embodiment.

The determination unit 32D generates change instruction when it is determined that the change instruction is to be notified.

In the present embodiment, the change instruction includes the setting value within the allowable range corresponding to the input/output characteristics type whose characteristic value falls outside the allowable range and the setting value within the allowable range corresponding to the internal state type whose condition value is outside the allowable range. The change instruction includes a setting value to make recovered the condition value that falls outside of an allowable range of the storage device 20 with respect to the internal state type.

The setting value is a value within the allowable range of the corresponding input/output characteristics type and the corresponding internal state type similarly to the first embodiment. In the present embodiment, the setting value is registered in advance in the allowable condition DB 33A.

The determination unit 32D specifies, from the monitored characteristics information 33B, the service ID including the input/output characteristics type having the characteristic value outside the allowable range or the internal state type having the condition value outside the allowable range. The determination unit 32D reads, from the allowable condition DB 33A, the setting value corresponding to each of a combination of the service ID and the input/output characteristics type and a combination of the service ID and the internal state type. By this reading process, the determination unit 32D generates the change instruction for respective services 12A.

The notification unit 12E is the same as that of the first embodiment. That is, the notification unit 12E notifies the storage device 20 of the change instruction for respective services 12A when the determination unit 32D determines that the change instruction is to be notified.

As described above, the storage monitoring unit 32G may register the internal condition in the internal condition DB 33E without correlating the internal condition with the service ID. In this case, the determination unit 32D may further determine whether the change instruction is to be notified from the allowable range corresponding to the internal state type in the internal condition DB 33E with respect to the internal condition that is not correlated with the service ID. In this case, the allowable condition DB 33A may register in advance the allowable range and the setting value which are not correlated with the service ID and which correspond to the internal state type.

Next, an example of a procedure of information processing executed by the information processing device 10B of the present embodiment will be described. The procedure of information processing executed by the information processing device 10B is the same as that of the second embodiment (see FIG. 13).

However, in the monitoring process of step S200, the information processing device 10B executes the input/output characteristics monitoring process by the characteristics monitoring unit 12C and the process of monitoring the internal condition of the storage device 20 by the storage monitoring unit 32G in parallel. In step S202, the information processing device 10B may allow the characteristics monitoring unit 12C and the storage monitoring unit 32G to store the input/output characteristics and the internal condition in the memory unit 33. After that, the information processing device 10B may execute the processes of steps 204 to S208.

As described above, in the information processing device 10B of the present embodiment, the storage monitoring unit 32G monitors the internal condition of the storage device 20. The determination unit 32D determines whether the change instruction is to be notified on the basis of the monitored characteristics information 33B further including the internal condition. The notification unit 12E notifies the change instruction when it is determined that the change instruction is to be notified.

Moreover, the information processing device 10B of the present embodiment can determine whether the change instruction is be notified at a larger number of timings in addition to the advantages of the above-described embodiment. Due to this, the storage device 20 can change the characteristics of the storage device 20 in a more detailed manner.

Therefore, the information processing device 10E of the present embodiment can suppress a decrease in the performance of the storage device 20 in addition to the advantages of the above-described embodiment.

Moreover, since the storage monitoring unit 32G monitors the internal condition, the information processing device 10B can notify the storage device 20 of the change instruction including the setting values of more detailed types at more appropriate timings.

Moreover, since the information processing device 10B further notifies the change instruction corresponding to the internal condition of the storage device 20, the storage device 20 can changes the characteristics more efficiently and suppress a decrease in performance.

Fourth Embodiment

In the present embodiment, an embodiment in which the communication characteristics of communication with external devices are further monitored will be described.

Figure 16:
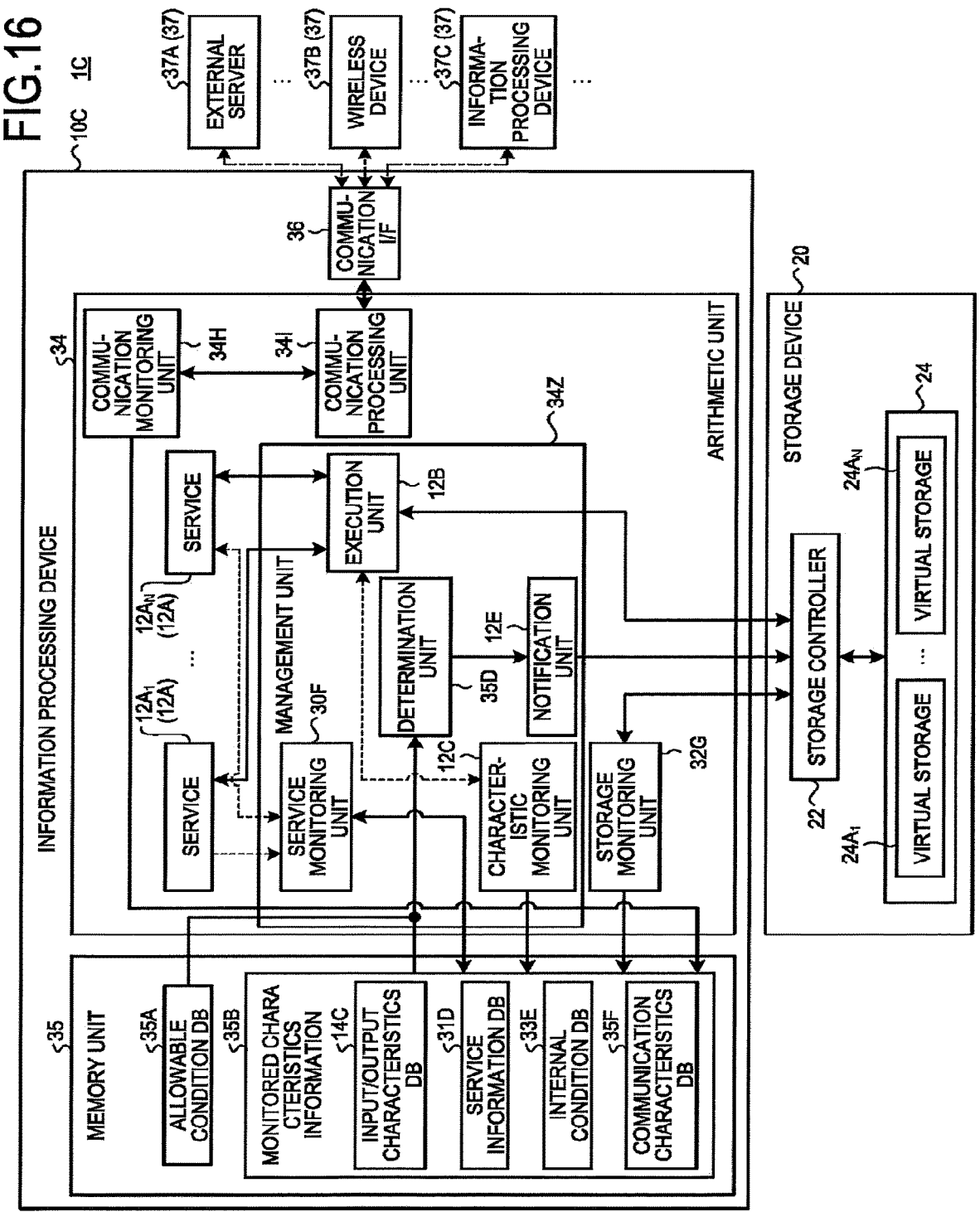
FIG. 16 is a schematic diagram of an information processing system.

FIG. 16 is a schematic diagram illustrating an example of an information processing system 1C according to the present embodiment.

The information processing system 1C includes an information processing device 10C and a storage device 20. The information processing system 1C is the same as the information processing system 1 of the first embodiment except that the information processing system 1C includes the information processing device 10C instead of the information processing device 10.

The information processing device 10C performs trend of input/output characteristics with respect to the storage device 20. The information processing device 10C includes an arithmetic unit 34, a memory unit 35, and a communication I/F The arithmetic unit 34 and the memory unit 35 are communicably connected. The arithmetic unit 34 and the communication I/F 36 are communicably connected.

The communication I/E 36 is a communication interface for communicating with an external device 37 by cable communication or wireless communication. That is, the information processing device 10C is an access point of a wireless LAN, a cable communication device, a cellular communication device, or a device in which a plurality of types of wireless or cable communication interfaces are integrated.

The external device 37 is an external server 37A, a wireless device 37B, an information processing device 37C, or the like, for example. The external server 37A is a known personal computer or the like that executes different processes from the information processing device 10C. The wireless device 37B is a device that communicates with the information processing device 10C by wireless communication. The information processing device 37C is another information processing device (for example, the information processing device 10A, the information processing device 10B, or the information processing device 10C) configured as a separate device from the information processing device 10C.

The memory unit 35 stores an allowable condition DB 35A and monitored characteristics information 35B instead of the allowable condition DB 14A and the monitored characteristics information 14B. The monitored characteristics information 35B includes an input/output characteristics DB 14C, a service information DB 31D, an internal condition DB 33E, and a communication characteristics DB 35F. The input/output characteristics DB 14C, the service information DB 31D, and the internal condition DB 33E are the same as those of the above-described embodiment. The details of the allowable condition DB 35A and the internal condition DB 33E will be described later.

The arithmetic unit 34 includes a service 12A, a communication monitoring unit 34H, a communication processing unit 34I, a management unit 34Z, and a storage monitoring unit 32G. The management unit 34Z includes an execution unit 12B, a characteristics monitoring unit 12C, a notification unit 12E, a service monitoring unit 30F, and a determination unit 35D. These respective units are realized by one or a plurality of processors, for example. For example, the respective units may be realized by causing a processor such as a CPU to execute programs (that is, the units may be realized by software). The respective units may be realized by a processor (that is, hardware) such as a dedicated IC. The respective units may be realized by a combination of software and hardware. When a plurality of processors are used, each processor may realize one of the respective units and may realize two or more units.

The service 12A, the execution unit 12B, the characteristics monitoring unit 12C, the notification unit 12E, the service monitoring unit 30F, and the storage monitoring unit 32G are the same as those of the above-described embodiment.

The communication processing unit 34I processes communication with the external device 37 via the communication I/F 36. For example, when a communication target external device 37 of the information processing device 10C is the wireless device 37B, the information processing device 10C functions as an access point of a wireless LAN.

The communication monitoring unit 34H monitors the communication characteristics of communication with the external device 37 by monitoring the communication processing unit 34I. That is, the communication monitoring unit 34H collects the communication characteristics from the communication processing unit 34I. The communication monitoring unit 34H may collect the communication characteristics from the external device 37 via the communication processing unit 34I and the communication I/F 36.

The communication characteristics are characteristics that depend on a communication operation and the number of external devices 37 with which the information processing device 10C performs cable communication or wireless communication. Specifically, the communication characteristics indicate a communication characteristics value of each communication characteristics type. The communication characteristics type is the type of communication characteristics and the communication characteristics value is the value of the communication characteristics type.

Examples of the communication characteristics type include the number of external devices 37 being connected to the information processing device 10C, a moving pattern of the external device 37 in connection, the number of external devices 37 which can use a specific link speed among the external devices 37 in connection, the number of external devices 37 which can communicate at a specific communication speed among the external devices 37 in connection, a bit error rate of communication with the external device 37 in connection, the number of connected or disconnected external devices 37 per unit time, the number of users connected to the information processing device 10C per unit time, the number of users of the service 12A per unit time, the number of external devices 37 for each strength of wireless communication waves, and a communication band.

The communication characteristics type may include the position (for example, an arrival direction of wireless communication waves) of the external device 37 in communication, authentication information (an address, a user name, and the like) used for authentication during connection, a change in strength of wireless waves used for communication with the wireless device 37B, a reception angle (an arrival angle) of wireless waves, a moving direction of the wireless device 37B, a moving speed of the wireless device 37B, identification information of the external device 37 in connection, and a communication band.

The communication characteristics type may be the number of wireless devices 37B in communication, the number of connected wireless devices 37B per unit time, the number of disconnected wireless devices 37B per unit time, and/or a communication traffic of the wireless device, the wireless device belonging to a predetermined group.

For example, the communication processing unit 34I classifies the sea route guidance during wireless communication into groups of reception wave strength in different ranges. The communication processing unit 34I may use the number of wireless devices 37B in wireless communication belonging to each group as the communication characteristics type. Moreover, for example, the communication processing unit 34I may classify the external devices 37 in communication into a plurality of groups according to the type of a communication method. The communication method type is IEEE802.11a, b, g, n, ac, a communication technology dedicated for high-speed communication, a communication technology dedicated for low-speed communication, a communication technology dedicated for short-range communication, and a communication technology dedicated for long-range communication.

The communication monitoring unit 34H acquires the communication characteristics value of one or a plurality of communication characteristics types by monitoring the communication processing unit 34I.

The communication monitoring unit 34H may calculate the communication characteristics values of other communication characteristics types using the communication characteristics values of one or a plurality of communication characteristics types. The communication monitoring unit 34H may monitor the communication characteristics by acquiring the communication characteristics values calculated by the communication processing unit 34I.

For example, the communication monitoring unit 34H may calculate an average value, a maximum value, and a minimum value per unit time for the communication characteristics values of a specific communication characteristics type collected from the communication processing unit 34I and may use the calculated value as the communication characteristics value.

The communication processing unit 34I may collect the communication characteristics from the external device 37 and output the communication characteristics to the communication monitoring unit 34H. The communication monitoring unit 34H may monitor the communication characteristics by receiving the communication characteristics from the communication processing unit 34I.

The communication monitoring unit 34H stores the monitored communication characteristics in the memory unit 35. In the present embodiment, the communication monitoring unit 34H registers the monitored communication characteristics in the monitored characteristics information 35B of the memory unit 35.

The monitored characteristics information 35B is information obtained by monitoring at least one of the trend of input/output characteristics with respect to the storage device 20, the service information, the internal condition, and the communication characteristics. In the present embodiment, a case in which the monitored characteristics information 35B is information obtained by monitoring all of the trend of input/output characteristics with respect to the storage device 20, the service information, the internal condition, and the communication characteristics will be described as an example.

Due to this, in the present embodiment, the monitored characteristics information 35B includes input/output characteristics, service information, an internal condition, and communication characteristics. That is, the monitored characteristics information 35B is the same as the monitored characteristics information 14B of the first embodiment except that the monitored characteristics information 35B further includes the service information, the internal condition, and the communication characteristics in addition to the input/output characteristics. Specifically, the monitored characteristics information 35B includes an input/output characteristics DB 14C, a service information DB 31D, an internal condition DB 33E, and a communication characteristics DB 35F. The input/output characteristics DB 14C, the service information DB 31D, and the internal condition DB 33E are the same as those of the above-described embodiment.

The communication characteristics DB 35F is a database that registers the communication characteristics. The communication characteristics DB 35F is not limited to a database.

Figure 17:
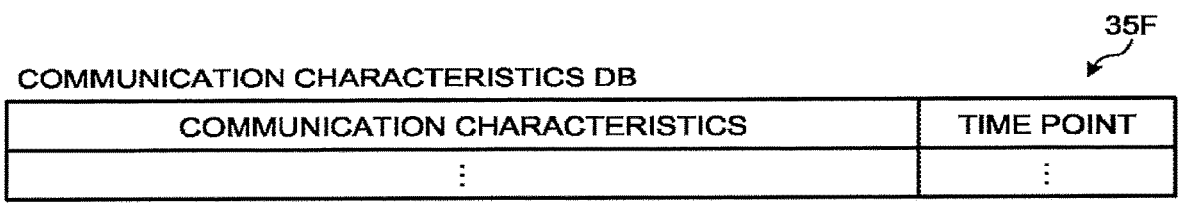
FIG. 17 is a schematic diagram of a data structure of communication characteristics.

FIG. 17 is a schematic diagram illustrating an example of a data structure of the communication characteristic: DB 35F. In the present embodiment, the communication characteristic: DB 35F is a database that registers the communication characteristics and time. More specifically, the communication characteristics DB 35F is a database that correlates the communication characteristics type, the communication characteristics value, and the time with each other. The time indicates a time point at which the communication characteristics value of the corresponding communication characteristics type was monitored.

Next, the determination unit 35D will be described. Similarly to the determination unit 12D of the first embodiment, the determination unit 35D determines that the change instruction is to be notified when it is determined that an input/output process with respect to the storage device 20 is not appropriate for the present assumed characteristics of the storage device 20. Specifically, the determination unit 35D determines whether the change instruction for changing the characteristics of the storage device 20 is to be notified to the storage device 20 on the basis of the monitored characteristics information 35B. That is, in the present embodiment, the determination unit 35D determines whether the change instruction is to be notified on the basis of the monitored characteristics information 35B further including the communication characteristics.

In the present embodiment, similarly to the above-described embodiment, the determination unit 35D determines whether the change instruction is to be notified using the input/output characteristics DB 14C, the service information DB 31D, the internal condition DB 33E, and the allowable condition DB 35A. In the present embodiment, the determination unit 35D determines whether the change instruction is to be notified using the communication characteristics DB 35F and the allowable condition DB 35A further.

The allowable condition DB 35A is a database that defines the allowable conditions of the input/output characteristics with respect to the storage device 20, the service information, the internal condition of the storage device 20, and the communication characteristics. A data format of the allowable condition DB 35A is not limited to a database.

The data structure of the allowable condition DB 35A is the same as that of the allowable condition DB 14A (see FIG. 2B). That is, the allowable condition DB 35A is a database that correlates a service ID, an allowable condition, and a setting value with each other. However, the allowable condition DB 35A may indicate the allowable ranges of values for each combination of the service 12A and the input/output characteristics types, each combination of the service 12A and the service information, and each combination of the service 12A and the internal state type.

The allowable range and the setting value may be determined in advance and registered in advance in the allowable condition DB 35A similarly to the first embodiment. As described above, the setting value may be a value within the corresponding allowable range. That is, in the present embodiment, the change instruction includes the setting value within the allowable range of the communication characteristics type whose communication characteristics value falls outside the allowable range of the storage device 20. The change instruction includes a setting value to make recovered the communication characteristics value that falls outside of an allowable range of the storage device 20 with respect to the communication characteristics type.

The allowable range and the setting value of the allowable range for respective communication characteristics types will be described in detail.

For example, when the communication characteristics type is "the number of external devices 37 being connected to the information processing device 10C", the allowable range is the number of external devices 37 within the allowable range of the storage device 20. Moreover, when the communication characteristics type is a "moving pattern of the external device 37 in connection", the allowable range is a specific moving pattern. Moreover, when the communication characteristics type is "the number of external devices 37 which can use a specific link speed among the external devices 37 in connection", the allowable range is the number of external devices 37 within the allowable range of the storage device 20. Moreover, when the communication characteristics type is a "bit error rate of communication with the external device 37 in connection", the allowable range is a bit error rate within the allowable range of the storage device 20. Furthermore, when the communication characteristics type is "identification information of the external device 37 set in advance", the allowable range is the identification information of the external device 37 within the allowable range of the storage device 20.

The determination unit 35D may determine that the change instruction is to be notified when information that does not satisfy at least a portion of the corresponding allowable condition in the allowable condition DB 35A is included in the monitored characteristics information 35B.

For example, the determination unit 35D determines that the change instruction is to be notified when the communication characteristics monitored by the communication monitoring unit 34H do not satisfy at least a portion of the allowable condition of the communication characteristics of communication with the storage device 20.

In the present embodiment, the determination unit 35D determines whether each of the types of values (the characteristic values of the input/output characteristics types, the service type values, the condition values of the internal state types, and the communication characteristics values of the communication characteristics types) included in the monitored characteristics information 35B is outside the corresponding allowable range. The determination unit 35D determines that the change instruction is to be notified when at least one type (at least one of the characteristic values of one or a plurality of input/output characteristics types, one or a plurality of service type values, the condition values of one or a plurality of internal state types, and the communication characteristics values of one or a plurality of communication characteristics types) has a value outside the corresponding allowable range.

Therefore, the determination unit 35D determines that the change instruction is to be notified at a larger number of timings than that of the first embodiment.

The determination unit 35D generates the change instruction when it is determined that the change instruction is to be notified.

In the present embodiment, the change instruction includes at least one of the setting value within the allowable range of the input/output characteristics type whose the characteristic value falls side the allowable range, the setting value within the allowable range of the service type whose values falls outside the allowable range, the setting value within the allowable range of the internal state type whose condition value falls outside the allowable range, and the setting value of the communication characteristics type whose communication characteristics value falls outside the allowable range.

Similarly to the first embodiment, the setting value is a value within the allowable range of the corresponding type (the input/output characteristics type, the service type, the internal state type, and the communication characteristics type). In the present embodiment, the setting value is registered in advance in the allowable condition DB 35A.

Due to this, similarly to the determination unit (the determination unit 12D, the determination unit 30D, and the determination unit 32D) of the above-described embodiment, the determination unit 35D reads, from the allowable condition DB 35A, the setting value corresponding to the type (the input/output characteristics type, the service type, the internal state type, and the communication characteristics type) having a value outside the allowable range. The determination unit 35D generates the change instruction including the read setting value within the allowable range.

Similarly to the first embodiment, the setting value may be a value for adjusting the characteristics of the storage device 20 so that the corresponding characteristic value within the allowable range is obtained in the allowable condition DB 35A. In this case, the determination unit 35D may generate a value for the adjustment using the information stored in the memory unit 35 and use the value as the setting value.

Specifically, the determination unit 35D manipulates the communication characteristics value within the allowable range to a value that the storage device 20 can use for changing the characteristics and uses the manipulated communication characteristics value as the setting value. For example, it is assumed that the communication characteristics type is a "moving speed of the wireless device 37B". In this case, the determination unit 35D predicts the amount of data input to or output from the storage device 20 from the communication characteristics value indicated by the "moving speed of the wireless device 37B". Here, there is a possibility that the faster the moving speed of the wireless device 37B, the more frequently and the more various pieces of information are input to or output from the storage device 20. Due to this, the determination unit 35D may calculate a setting value such that the faster the moving speed, the larger the data mount indicated by the setting value as the setting value corresponding to the "moving speed of the wireless device 37B".

In this case, the storage device 20 can change the characteristics so that the faster the moving speed of the wireless device 37B, the larger the capacity and the slower the moving speed, the smaller the capacity.

The determination unit 35D may omit the manipulation process when the storage device 20 can change the characteristics using the communication characteristics monitored by the communication monitoring unit 34H.

The notification unit 12E is the same as that of the above-described embodiment. That is, the notification unit 12E notifies the storage device 20 of the change instruction when the determination unit 35D determines that the change instruction is to be notified.

Next, an example of a procedure of information processing executed by the information processing device 10C of the present embodiment will be described. The procedure of information processing executed by the information processing device 10C is the same as that of the second embodiment (see FIG. 13).

However, in the monitoring process of step S200, the information processing device 10C executes the input/output characteristics monitoring process by the characteristics monitoring unit 12C, the service information monitoring process by the service monitoring unit 30F, the monitoring process of monitoring the internal condition of the storage device 20 by the storage monitoring unit 32G, and the communication characteristics monitoring process by the communication monitoring unit 34H in parallel. In step S202, the information processing device 10C may allow the characteristics monitoring unit 12C, the storage monitoring unit 32G, the service monitoring unit 30F, and the communication monitoring unit 34H to store the input/output characteristics, the internal condition, the service information, and the communication characteristics in the memory unit 35. The information processing device 10C may execute the processes of steps 204 to S208.

As described above, in the information processing device 10C of the present embodiment, the communication monitoring unit 34H monitors the communication characteristics of communication with the external device 37. The determination unit 35D determines whether the change instruction is to be notified on the basis of the monitored characteristics information 353 including the communication characteristics. Moreover, the notification unit 12E notifies the change instruction when it is determined that the change instruction is to be notified.

Due to this, the information processing device 10C of the present embodiment can determine whether the change instruction is to be notified at a larger number of timings in addition to the advantages of the above-described embodiment. Therefore, the storage device 20 can change the characteristics of the storage device 20 in a more detailed manner.

Therefore, the information processing device 10C of the present embodiment can suppress a decrease in performance of the storage device 20 in addition to the advantages of the above-described embodiment.

As described above, the communication characteristics are characteristics that depend on the communication operation and the number of external devices 37 with which the information processing device 10C performs cable communication or wireless communication. When the communication characteristics change, the demand for the service 12A and the input/output request that the service 12A transmits to the storage device 20 change.

Due to this, when the notification unit 12E notifies the storage device 20 of the change instruction corresponding to the monitored characteristics information 35B further including the communication characteristics, the storage device 20 can adjust the characteristics more efficiently.

The notification unit 12E is not limited to an embodiment in which the change instruction is notified for respective services 12A. The notification unit 12E may notify the storage device 20 of the change instruction for respective types (the input/output characteristics types, the service types, the internal state types, and the communication characteristics types) of the setting values Moreover, the notification unit 12E may notify the storage device 20 of the change instruction for respective external devices 37 which are communication characteristics monitoring targets.

Moreover, the notification unit 12E may classify the external devices 37 into a plurality of groups according to the communication characteristics and may notify the storage device 20 of the change instruction for respective groups. In this case, for example, the notification unit 12E may classify the external devices 37 into a plurality of groups using the reception angle of radio waves, the moving speed, and the like indicated by the communication characteristics. Parameters used for classification of groups are not limited to the reception angle and the moving speed.

Third Modification

The determination unit 35D may determine whether the change instruction is to be notified using a statistical value of the monitored characteristics information 35B. The statistical value indicates the trend or characteristics of the data indicated by the monitored characteristics information 35B. For example, the determination unit 35D may calculate an average value of the number of external devices 37 being connected to the information processing device 10C in the same date or time period in the past as the statistical value and may use the statistical value for determining notification of the change instruction.

Since the determination unit 35D makes determination using the statistical value of the monitored characteristics information 35B, the storage device 20 can flexibly adjust the characteristics according to a change in the date, the time period, or the like.

An event used for calculating the statistical value is not limited to the date and the time period. Moreover, the number of events used for calculating the statistical value is not limited to two but may be one or three or more.

For example, the determination unit 35D may calculate the statistical value using identification information (for example, a MAC address) of the external device 37, a connection date, a connection time period, the group of users using a specific service 12A, the location of the wireless device 37B, and the like. The determination unit 35D may use the statistical value in determining whether the change instruction is to be notified.

By this process, the notification unit 12E can notify the storage device 20 of the change instruction at a timing corresponding to the statistical value.

The change instruction further including the setting value within the allowable range of the statistical value may be notified to the storage device 20.

Fourth Modification

The communication monitoring unit 34H may acquire the communication characteristics monitored by the information processing device 37C from the information processing device 37C which is another information processing device 10C as the external device 37. In this case, the information processing device 37C may have the same configuration as the information processing device 10C of the present embodiment.

The determination unit 35D may determine whether the change instruction is to be notified on the basis of the monitored characteristics information 31B further including the statistical values of the communication characteristics acquired from the information processing device 37C and the communication characteristics monitored by the communication monitoring unit 34H.

That is, the determination unit 35D may determine whether the change instruction is to be notified using a plurality of statistical values of communication characteristics monitored by a plurality of information processing devices 10C (the information processing device 10C and one or a plurality of information processing devices 37C).

In this case, the determination unit 35D may use information or attributes unique to the wireless device 37B connected to a wireless network, the number of wireless devices 378 having common characteristics, derived from the information on a user of the wireless device 37B and the attribute of the user, and the like as the statistical value.

The determination unit 35D may acquire the communication characteristics of the wireless device 37B that performs wireless communication with the information processing device 37C from the information processing device 37C which is another information processing device 10C as the statistical value.

The determination unit 35D may determine whether the change instruction is to be notified in a manner similarly to the above-described embodiment on the basis of the monitored characteristics information 35B further including the statistical values of the communication characteristics monitored by the communication monitoring unit 34H of the information processing device 10C and the communication characteristics acquired from another information processing device 10C (the information processing device 37C).

For example, it is assumed that the determination unit 35D has acquired a communication band of wireless communication between another information processing device 10C and the wireless device 37B as the communication characteristics of the wireless device 37B that performs wireless communication with the other information processing device 10C. In this case, the determination unit 35D may determine that the change instruction is to be notified when the communication band is outside the allowable range.

In this way, in the present modification, the information processing device 10C determines whether the change instruction is to be notified on the basis of the monitored characteristics information 35B further including the statistical values of the communication characteristics monitored by the communication monitoring unit 34H of the information processing device 10C and the communication characteristics acquired from the other information processing device 10C (the information processing device 37C).

Due to this, the information processing device 10C of the present modification can realize a cooperative process by a plurality of information processing devices 10C in addition to the advantages of the above-described embodiment.

The communication monitoring unit 34H may acquire the communication characteristics from the information processing device 37C which is another information processing device 10C via the communication processing unit 34I and the communication I/F 36. Moreover, the communication monitoring unit 34H may acquire the communication characteristics of the information processing device 37C from the external server 37A such as a cloud server or a dedicated server that manages the information processing device 37C.

Fifth Embodiment

In the present embodiment, an embodiment in which a notification timing is adjusted further will be described.

Figure 18:
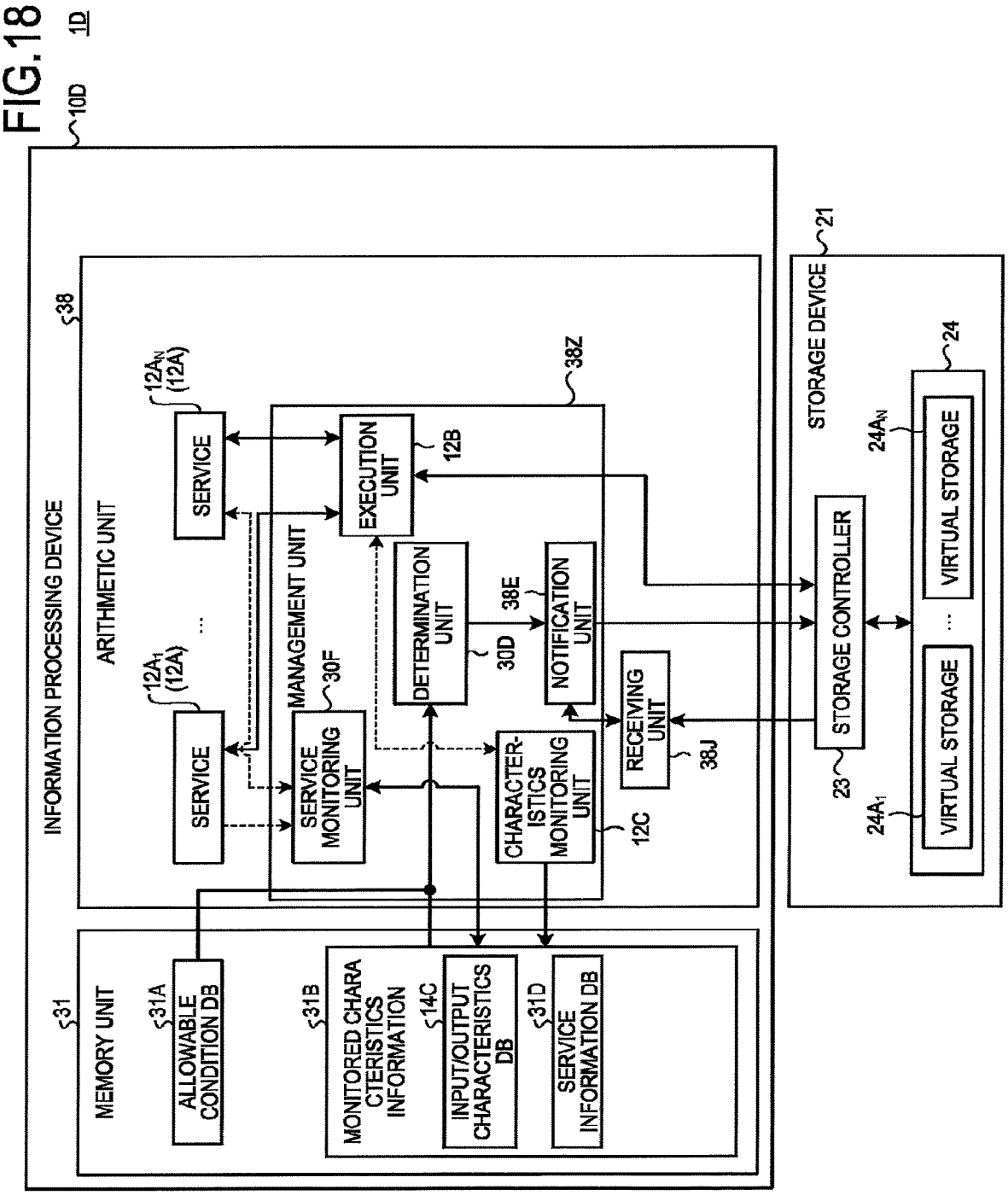
FIG. 18 is a schematic diagram of an information processing system.

FIG. 18 is a schematic diagram illustrating an example of an information processing system 1D according to the present embodiment.

The information processing system 1D includes an information processing device 10D and a storage device 21. The information processing system 1D includes the information processing device 10D instead of the information processing device 10 and includes the storage device 21 instead of the storage device 20.

The storage device 21 includes a storage controller 23 and a virtual storage 24. The storage device 21 is the same as the storage device 20 of the first embodiment except that the storage device 21 includes the storage controller 23 instead of the storage controller 22.

The storage controller 23 controls data write and data read with respect to the virtual storage 24 similarly to the storage controller 22. Moreover, the storage controller 23 changes the characteristics of the virtual storage 24 act the change instruction received from the information processing device 10D.

In the present embodiment, the storage controller 23 outputs timing information to the information processing device 10D. The timing information is information indicating a request notification timing of change instruction. The request notification timing is a timing at which the storage device 20 wants to be notified of the change instruction. The request notification timing is represented by a period elapsed after the previous change instruction was received, a time point, and the like, for example.

For example, tree storage controller 23 outputs a timing at which a characteristic changing operation such as an internal processing, allocation of the virtual storage 24, garbage collection, and wear leveling is scheduled to be executed to the information processing device 10D as the timing information indicating the request notification timing.

Next, the information processing device 10D will be described. The information processing device 10D includes an arithmetic unit 38 and a memory unit 31. The memory unit 31 is the same as that of the second embodiment. The arithmetic unit 38 and the memory unit 31 are communicably connected.

The arithmetic unit 38G includes a service 12A and a management unit 38Z. The service 12A is the same as that of the above-described embodiment. The management unit 38Z includes an execution unit 12B, a characteristics monitoring unit 12C, a notification unit 38E, a service monitoring unit 30F, a determination unit 30D, and a receiving unit 38J. The execution unit 12B, the determination unit 30D, the characteristics monitoring unit 12C, and the service monitoring unit 30F are the same as those of the second embodiment.

That is, the management unit 38Z is the same as the management unit 30Z of the second embodiment except that the management unit 38Z includes the notification unit 38E instead of the notification unit 12E and further includes the receiving unit 38J (see FIG. 11).

The receiving unit 38J receives the timing information from the storage device 21. Similarly to the second embodiment, the determination unit 30D determines whether the change instruction is to be notified using the monitored characteristics information 31B and the allowable condition DB 31A.

When the determination unit 30D determines that the change instruction is to be notified to the storage device 21, the notification unit 38E determines the notification timing of the change instruction on the basis of the request notification timing indicated by the timing information received by the receiving unit 38J. The notification unit 38E notifies the storage device 21 of the change instruction at the determined notification timing.

For example, the notification unit 38E determines the notification timing by the following method. For example, a timing at which the determination unit 30D determines that the change instruction is to be notified is set as a timing Xi (i is an integer of 1 or more). Moreover, the request notification timing indicated by the timing information received by the receiving unit 38J is set as a request notification timing Yj (j is an integer of 1 or more). Moreover, it is assumed that the interval of the timing Xi is shorter than the interval of the timing Yj.

In this case, the notification unit 38E calculates a set (an Xi–Yj pair) of the timing Xi and the request notification timing Yj having the smallest difference. Moreover, a later timing (the timing Xi or the request notification timing Yj) among the timings indicated by the calculated set is determined as the notification timing at which the change instruction is notified.

The notification unit 38E may determine the notification timing on the basis of the determined timing and the request notification timing, and the notification timing determining method is not limited to the above-described method.

The notification unit 38E notifies the storage device 21 of the change instruction at the determined notification timing.

Next, an example of a procedure of information processing executed by the information processing device 10D of the present embodiment will be described.

FIG. 19 is a flowchart illustrating an example of a procedure of information processing executed by the information processing device 10D of the present embodiment.

The information processing device 10D executes processes of steps S300 to S306 similarly to steps S200 to S206 of the information processing device 10C of the second embodiment (see FIG. 13).

That is, the characteristics monitoring unit 12C and the service monitoring unit 30F execute the monitoring process (step S300). The characteristics monitoring unit 12C and the service monitoring unit 30F execute a process of storing information in the memory unit 31 (step S302). Subsequently, the determination unit 30D determines whether the change instruction is to be notified to the storage device 20 (step S304). When a negative determination result is obtained in step S304 (step S304: No), the flow returns to step S300. On the other hand, when a positive determination result is obtained in step S304 (step S304: Yes), the flow proceeds to step S306. In step S306, the determination unit 30D generates the change instruction (step S306).

Subsequently, the receiving unit 38O receives the timing information from the storage device 21 (step S306). The receiving unit 36J may receive the timing information whenever timing information is output from the storage device 21. The receiving unit 38J may output the received timing information to the notification unit 36E, whenever the timing information is received.

The notification unit 39E determines the notification timing of the change instruction on the basis of the timing at which notification of the change instruction is determined in step S304 and the request notification timing indicated by the timing information received in step S308 (step S310). The notification unit 38E notifies the storage device 21 of the change instruction generated in step S306 at the notification timing determined in step S310 (step 212). In this way, the present routine ends.

As described above, in the present embodiment, the receiving unit 38J of the information processing device 100 receives the timing information indicating the request notification timing from the storage device 21. When the determination unit 30D determines that the change instruction is to be notified, the notification unit 38E notifies the storage device 21 of the change instruction at the notification timing determined on the basis of the determined timing and the request notification timing indicated by the timing information.

Due to this, the information processing device 10D of the present embodiment notifies the change instruction at the notification timing corresponding to the timing determined by the information processing device 10D and the notification request timing received from the storage device 21.

Due to this, the information processing device 10D of the present embodiment can notify the storage device 21 of the change instruction without imposing an additional load to the storage device 21 in addition to the advantages of the above-described embodiment. Therefore, the storage device 21 can change the characteristics according to the change instruction without any additional load.

The notification unit 38E may notify the storage device 21 of the change instruction including a plurality of setting values for one type (one of one or a plurality of input/output characteristics types and one or a plurality of service types). For example, a plurality of setting values arranged in a time-series manner for one type may be notified. In this case, the storage device 21 can predict the future characteristics of the storage device 21 with the lapse of time according to the setting values arranged in a time-series manner. Moreover, the storage device 21 can change the characteristics according to the predicted characteristics.

In the present embodiment, an embodiment in which the information processing device 10D further includes the receiving unit 38J in addition to the constituent components of the information processing device 10A (see FIG. 11) of the second embodiment has been described. However, the information processing device 10D of the present embodiment is not limited to a configuration in which the receiving unit 38J is further included in the constituent components of the information processing device 10A of the second embodiment. That is, the information processing device 10D may have a configuration in which the receiving unit 38J is further included in the constituent components of any one of the above-described embodiments.

Sixth Embodiment

In the above-described embodiment, the notification unit 12E (the notification unit 38E) notified the storage device 20 (the storage device 21) of the change instruction for changing the characteristics. Moreover, the storage device 20 (the storage device 21) changed the characteristics according to the received change instruction.

On the other hand, in the present embodiment, an embodiment in which characteristics after change are generated and notified to the storage device 20 will be described.

FIG. 20 is a schematic diagram illustrating an example of an information processing system 1E according to the present embodiment.

The information processing system 1E has an information processing device 10E and a storage device 20. The memory unit 31 and the storage device 20 are the same as those of the second embodiment (see FIG. 11).

The arithmetic unit 39 includes a service 12A and a management unit 39Z. The arithmetic unit 39 includes an execution unit 12B, a characteristics monitoring unit 12C, a service monitoring unit 30F, a determination unit 30D, a deriving unit 39K, and a notification unit 39E. The execution unit 12B, the characteristics monitoring unit 12C, the service monitoring unit 30E, and the determination unit 30D are the same as those of the second embodiment.

The deriving unit 39K derives characteristics after change of the storage device 20 on the basis of the change instruction. For example, the deriving unit 39K derives the characteristics after changing the communication characteristics value of the virtual storage 24, the garbage collection, the wear leveling, or the like so that the setting values of the respective types indicated by the change instruction are realized.

The deriving unit 39K may derive the characteristics after change using information stored in the memory unit 31. Moreover, the deriving unit 39K may further derive the characteristics after change by collecting information from the storage device 20 via the notification unit 39E.

The notification unit 39E notifies the storage device 20 of the characteristics after change derived by the deriving unit 39K. The notification unit 39E may notify the storage device 20 of both the characteristics after change and the change instruction.

The storage controller 22 of the storage device 20 having received the characteristics after change may change the characteristics so as to be the received characteristics after change. Due to this, the storage controller 22 can change the characteristics of the virtual storage 24 without executing complex computation and processes.

The deriving unit 39K may be provided in an external device communicably connected to the information processing device 10E. The external device is a management server on a cloud, for example. In this case, the determination unit 30D reads information necessary for deriving the characteristics after change from the memory unit 31 and transmits the information to the external device. After that, the deriving unit 39K derives the characteristics after change in the above-described manner. The notification unit 39E acquires the characteristics after change from the deriving unit 39K provided in the external device. The notification unit 39E may notify the storage device 20 of the acquired characteristics after changed.

Next, an example of a procedure of information processing executed by the information processing device 10E of the present embodiment will be described. FIG. 21 is a flowchart illustrating an example of a procedure of information processing executed by the information processing device 10E of the present embodiment.

The information processing device 10E performs the processes of steps S400 to S406 in a manner similarly to steps S200 to S206 (see FIG. 13) of the information processing device 10A of the second embodiment.

That is, the characteristics monitoring unit 12C and the service monitoring unit 30F execute a monitoring process (step S400). Subsequently, the characteristics monitoring unit 12C and the service monitoring unit 30F execute a process of storing information in the memory unit 31 (step S402).

Subsequently, the determination unit 30D determines whether the change instruction is to be notified to the storage device 20 (step S404). When a negative determination result is obtained in step S404 (step S404: No), the flow returns to step S400. On the other hand, when a positive determination result is obtained in step S404 (step S404: Yes), the flow proceeds to step S406. In step S406, the determination unit 30D generates the change instruction (step S406).

Subsequently, the deriving unit 39K derives the characteristics after change on the basis of the change instruction generated in step S406 (step S408). Subsequently, the notification unit 39E notifies the storage device 20 of the characteristics after change derived in step S408 (step S410). In this way, the present routine ends.

As described above, in the present embodiment, the deriving unit 39K derives the characteristics after change of the storage device 20. The notification unit 39E notifies the storage device 20 of the characteristics after change.

Due to this, the information processing device 10E of the present embodiment can suppress a decrease in performance of the storage device 20 more efficiently in addition to the advantages of the above-described embodiment.

Fifth Modification

In the embodiments and the modifications, an embodiment in which the notification unit (the notification units 12E, 38E, and 39E) notifies the storage device 20 of the change instruction or the characteristics after change for the respective services 12A or the respective types of setting values has been described.

During this notification, the notification unit (the notification units 12E, 38E, and 39E) may notify the storage device (the storage devices 20 or 21) of the change instruction at once. Moreover, the notification unit (the notification units 12E, 38E, and 39E) may notify the change instruction for respective services 12A or the types of setting values.

When a plurality of types of setting values are included in the change instruction, the notification unit (the notification units 12E, 38E, and 39E) may notify the setting values after sorting the included setting values using the time point at which the corresponding types were monitored.

In this case, the storage device (the storage devices 20 and 21) can change the characteristics sequentially according to the monitored time points.

When the characteristics were changed, the storage device (the storage devices 20 and 21) may sequentially notify the information processing device (the information processing devices 10, 10A, 10B, 10C, 10D, and 10E) of the information indicating the characteristics after change.

In this case, the arithmetic unit (the arithmetic units 12, 30, 32, 34, 38, and 39) of the information processing device (the information processing devices 10, 10A, 10B, 10C, 10D, and 10E) may predict the future state of the storage device (the storage devices 20 and 21) using information indicating the received characteristics after change. The arithmetic unit may generate the change instruction for changing the characteristics appropriately according to the prediction result using the prediction result and notify the storage device (the storage devices 20 and 21) of the change instruction.

Sixth Modification

In the above-described embodiment, a case in which the information processing device (the information processing devices 10, 10A, 10B, 10C, 10D, and 10E) and the storage device (the storage devices 20 and 21) are configured as separated devices has been described. However, the information processing device (the information processing devices 10, 10A, 10B, 10C, 10E, and 10E) and the storage device (the storage devices 20 and 21) may be configured as an integrated device.

Hardware Configuration

Next, an example of a hardware configuration of the information processing devices 10, 10A, 10B, 10C, 10E, and 10E of the above-described embodiment will be described. FIG. 22 illustrates an example of a hardware configuration of the information processing devices 10, 10A, 10B, 10C, 10D, and 10E of the above-described embodiment.

The information processing devices 10, 10A, 10B, 10C, 10D, and 10E of the above-described embodiments include a control device such as a CPU 86, a memory device such as a read only memory (ROM) 88, a random access memory (RAM) 90, or a hard disk drive (HDD) 92, an I/F unit 82 which is an interface with various devices, and a bus 96 that connects various units, and has a hardware configuration which uses a general computer.

In the information processing devices 10, 10A, 10B, 10C, 10D, and 10E of the above-described embodiments, the CPU 86 reads programs from the ROM 88 onto the RAM 90 and executes the programs whereby the respective units are realised on a computer.

The programs for executing each of the processes executed by the information processing devices 10, 10A, 10B, 10C, 10D, and 10E of the above-described embodiments may be stored in the HDD 92. Moreover, the programs for executing each of the processes executed by the information processing devices 10, 10A, 10B, 10C, 10D, and 10E of the above-described embodiments may be incorporated in advance in and provided by the ROM 88.

The programs for executing the processes executed by the information processing devices 10, 10A, 10B, 10C, 10D, and 10E of the above-described embodiments may be stored in a computer-readable storage medium such as a CD-ROM, a CD-R, a memory card, a digital versatile disk (DVD), or a flexible disk (FD) in an installable file format or an executable file format and be provided as a computer program product. Moreover, the programs for executing the processes executed by the information processing devices 10, 10A, 10B, 10C, 10D, and 10E of the present embodiment may be provided by storing the same on a computer connected to a network such as the Internet and downloading the same via a network. Furthermore, the programs for executing the processes executed by the information processing devices 10, 10A, 10B, 10C, 10D, and 10E of the present embodiment may be provided or distributed via a network such as the network.

What is claimed is:

1. An information processing device comprising:
an execution unit that executes a plurality of applications, each of the plurality of applications issuing a request for an input/output operation to a storage device;
a monitoring unit that monitors utilization information that indicates each of its performance of each of information stored in the storage device and lifetime of each of information stored in the storage device, and includes input/output information, the input/output information including information regarding input/output operations with respect to the storage device for respective of the plurality of applications;
a determination unit that determines, based on monitored utilization information, whether a change instruction for changing utilization conditions is to be notified to the storage device, and
a notification unit that notifies the storage device of the change instruction when the determination unit determines that the change instruction is to be notified,
wherein the lifetime of each of information stored in the storage device is a retention period of each file stored in the storage device.

2. The information processing device according to claim 1, wherein the determination unit determines that the change instruction is to be notified when a trend of the input/output information with respect to the storage device is outside of an allowable range of the storage device.

3. The information processing device according to claim 1, wherein the determination unit determines that the change instruction is to be notified when the monitored utilization information does not satisfy at least one of allowable conditions of a trend of input/output information of the storage device.

4. The information processing device according to claim 1, wherein
the input/output information include utilization values for each input/output utilization type, and
the change instruction includes a setting value to make recovered the utilization value that falls outside of an allowable range with respect to the input/output utilization type.

5. The information processing device according to claim 1, further comprising an execution unit that executes input/output with respect to the storage device in response to an input/output request with respect to the storage device from a service, wherein
the notification unit notifies the storage device of the change instruction for each service.

6. The information processing device according to claim 5, further comprising a service monitoring unit that monitors service information related to the service, wherein
the determination unit determines, based on the monitored utilization information further including the service information, whether the change instruction is to be notified.

7. The information processing device according to claim 1, further comprising a storage monitoring unit that monitors an internal condition of the storage device, wherein
the determination unit determines, based on the monitored utilization information further including the internal condition, whether the change instruction is to be notified.

8. The information processing device according to claim 7, wherein
the internal condition indicates a condition value for each internal state type, and the change instruction includes a setting value to make recovered the condition value that falls outside of an allowable range of the storage device with respect to the internal state type.

9. The information processing device according to claim 1, further comprising a communication monitoring unit that monitors communication utilization of communication with an external device, wherein the determination unit determines, based on the monitored utilization information further including the communication utilization, whether the change instruction is to be notified.

10. The information processing device according to claim 9, wherein the communication utilization include a communication utilization value for each communication utilization type, and the change instruction includes a setting value to make recovered the communication utilization value that falls outside of an allowable range of the storage device with respect to the communication utilization type.

11. The information processing device according to claim 9, wherein the determination unit determines whether the change instruction is to be notified, based on the monitored utilization information further including statistical values of a plurality of communication utilization including the communication utilization acquired from another information processing device.

12. The information processing device according to claim 1, further comprising a receiving unit that receives timing information indicating a request notification timing from the storage device, wherein when the determination unit determines that the change instruction is to be notified, the notification unit notifies the storage device of the change instruction at a notification timing determined based on the determined timing and the request notification timing indicated by the timing information.

13. The information processing device according to claim 1, further comprising a deriving unit that derives utilization after change of the storage device, based on the change instruction, wherein the notification unit notifies the storage device of the derived utilization after change instead of the change instruction.

14. The information processing device according to claim 1, wherein the determination unit determines for respective of the plurality of applications whether the change instruction is to be notified to the storage device.

15. An information processing method comprising:

executing a plurality of applications, each of the plurality of applications issuing a request for an input/output operation to a storage device;

monitoring input/output utilization information that indicates each of its performance of each of information stored in the storage device and lifetime of each of information stored in the storage device;

determining, based on monitored utilization information, whether change instruction for changing utilization conditions is to be notified to the storage device, and notifying the storage device of the change instruction when the change instruction is determined to be notified, wherein the lifetime of each of information stored in the storage device is a retention period of each file stored in the storage device.

16. A non-transitory computer-readable storage medium storing an information processing program for causing a computer to execute:

executing a plurality of applications, each of the plurality of applications issuing a request for an input/output operation to a storage device;

monitoring input/output utilization information that indicates each of its performance of each of information stored in the storage device and lifetime of each of information stored in the storage device;

determining, based on monitored utilization information, whether change instruction for changing utilization conditions is to be notified to the storage device, and notifying the storage device of the change instruction when the change instruction is determined to be notified, wherein the lifetime of each of information stored in the storage device is a retention period of each file stored in the storage device.

17. An information processing system comprising:

an information processing device; and a storage device that communicates with the information processing device, the information processing device including an execution unit that executes a plurality of applications, each of the plurality of applications issuing a request for an input/output operation to a storage device;

a monitoring unit that monitors utilization information that indicates each of its performance of each of information stored in the storage device and lifetime of each of information stored in the storage device, and includes input/output information, the input/output information including information regarding input/output operations with respect to the storage device for respective of the plurality of applications;

a determination unit that determines, based on monitored utilization information, whether change instruction for changing utilization conditions is to be notified to the storage device, and a notification unit that notifies the storage device of the change instruction when the determination unit determines that the change instruction is to be notified, wherein the lifetime of each of information stored in the storage device is a retention period of each file stored in the storage device.

* * * * *